(12) United States Patent
Chen

(10) Patent No.: US 11,796,151 B2
(45) Date of Patent: Oct. 24, 2023

(54) OPTICAL FILM AND LIGHT EMITTING MODULE USING THE SAME

(71) Applicant: YTDIAMOND CO., LTD., Taoyuan (TW)

(72) Inventor: Ying-Tung Chen, Taoyuan (TW)

(73) Assignee: YTDIAMOND CO., LTD., Taoyuan (TW)

( * ) Notice: Subject to any disclaimer, the term of this patent is extended or adjusted under 35 U.S.C. 154(b) by 0 days.

(21) Appl. No.: 18/114,316

(22) Filed: Feb. 27, 2023

(65) Prior Publication Data

US 2023/0304645 A1    Sep. 28, 2023

(30) Foreign Application Priority Data

Mar. 24, 2022   (TW) ................................. 11111097.7

(51) Int. Cl.
*F21V 5/00* (2018.01)
*F21Y 115/10* (2016.01)

(52) U.S. Cl.
CPC ........... *F21V 5/002* (2013.01); *F21Y 2115/10* (2016.08)

(58) Field of Classification Search
CPC ...................................................... F21V 5/002
See application file for complete search history.

(56) References Cited

U.S. PATENT DOCUMENTS

| | | | | |
|---|---|---|---|---|
| 8,969,896 B2* | 3/2015 | Ikeda | ................... | H10K 50/858 257/40 |
| 9,709,721 B2* | 7/2017 | Gourlay | ............... | G02B 6/0068 |
| 10,203,074 B2* | 2/2019 | Herrmann | ................. | F21K 9/69 |
| 10,854,692 B2* | 12/2020 | Chang | .................... | H10K 59/35 |
| 11,442,214 B2* | 9/2022 | Rinko | .................. | G02B 6/0063 |
| 11,573,004 B2* | 2/2023 | Yun | ........................... | F21V 7/30 |
| 2006/0046159 A1* | 3/2006 | Emslander | .............. | G09F 19/14 430/323 |
| 2006/0204676 A1* | 9/2006 | Jones | ..................... | B82Y 30/00 428/156 |
| 2008/0259634 A1* | 10/2008 | Mi | ................... | B29D 11/00663 264/1.6 |
| 2011/0134646 A1* | 6/2011 | Yang | .................. | G02B 27/0961 362/311.06 |

FOREIGN PATENT DOCUMENTS

| | | |
|---|---|---|
| CN | 105652454 B | 11/2018 |
| TW | M639575 U | 4/2023 |

* cited by examiner

*Primary Examiner* — Bryon T Gyllstrom
(74) *Attorney, Agent, or Firm* — Li & Cai Intellectual Property (USA) Office

(57) ABSTRACT

An optical film and a light emitting module using the same are disclosed. The light emitting module includes a light emitting assembly and an optical film. The light emitting assembly includes a substrate and a plurality of light emitting units disposed on the substrate. The optical film is disposed above the light emitting units, and includes a base layer and a first optical structure. The first optical structure is disposed on the base layer and includes a first high refractive index layer and a first low refractive index layer. The first high refractive index layer is located between the light emitting assembly and the first low refractive index layer. The first inclined surfaces are formed on an interface between the first high refractive index layer and the first low refractive index layer. Each first inclined surface is inclined relative to a thickness direction of the base layer.

16 Claims, 21 Drawing Sheets

OPTICAL FILM AND LIGHT EMITTING MODULE USING THE SAME

CROSS-REFERENCE TO RELATED PATENT APPLICATION

This application claims the benefit of priority to Taiwan Patent Application No. 111110977, filed on Mar. 24, 2022. The entire content of the above identified application is incorporated herein by reference.

Some references, which can include patents, patent applications and various publications, can be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical film and a light emitting module using the same, and more particularly to an optical film applied to a display device and a light emitting module using the same.

BACKGROUND OF THE DISCLOSURE

In the related art, backlight modules have been widely used in display devices, especially liquid crystal display devices, to provide light sources required for displaying images. The prior backlight module generally includes a light emitting assembly and an optical assembly disposed above a backlight source. The optical assembly can be used to adjust the light beams generated by the light emitting assembly in order to uniformly distribute the brightness.

The light emitting assembly in the backlight module usually includes a plurality of light emitting diodes (LEDs) or sub-millimeter light emitting diodes (mini LEDs) arranged in an array, and the light beams generated by the light emitting assembly are concentrated and have high directivity. Therefore, in order to convert a point light source array generated by the light emitting assembly into a surface light source, the optical assembly usually needs to use more optical films, such as light guide films, diffusers, or brightness enhancement films, and to use physical phenomena such as light refraction, reflection or scattering to diffuse the light beam generated by the light emitting assembly to the entire display area. As a result, the total thickness of the optical assembly cannot be further reduced.

SUMMARY OF THE DISCLOSURE

In response to the above-referenced technical inadequacy, the present disclosure provides an optical film and a light emitting module using the optical film. The optical film has a good diffusion effect for point light sources and can be used in the light emitting module of a display device.

In one aspect, the present disclosure provides a light emitting module, which includes a light emitting assembly and an optical film. The light emitting assembly includes a substrate and a plurality of light emitting units disposed on the substrate. The optical film is disposed above the light emitting units, and the optical film includes a base layer and a first optical structure. The first optical structure is disposed on the base layer and includes a first high refractive index layer and a first low refractive index layer. The first high refractive index layer is located between the light emitting assembly and the first low refractive index layer, a plurality of first inclined surfaces are formed on an interface between the first high refractive index layer and the first low refractive index layer, and each of the first inclined surfaces is inclined relative to a thickness direction of the base layer. The first low refractive index layer has a plurality of recessed microstructures, the first high refractive index layer fills the recessed microstructures of the first low refractive index layer so as to form a plurality of protruding microstructures on the first high refractive index layer, a shape of each of the protruding microstructures of the first high refractive index layers and a shape of each of the recessed microstructures of the first low refractive index layer cooperate with each other, and a refractive index of the first high refractive index layer is greater than a refractive index of the first low refractive index layer. Furthermore, two of the first inclined surfaces connected with each other to form a first included angle, and the first included angle, the refractive index of the first high refractive index layer and the refractive index of the first low refractive index layer satisfy the following relationship: $\theta1 \leq (180 - 2*\arc \sin(n10/n11))$, in which $\theta1$ is the first included angle, $n11$ is the refractive index of the first high refractive index layer, and $n10$ is the refractive index of the first low refractive index layer.

In another aspect, the present disclosure provides an optical film, which includes a base layer and a first optical structure. The first optical structure is disposed on a light input side of the base layer and includes a first high refractive index layer and a first low refractive index layer. The first high refractive index layer is located between the first high refractive index layer and the base layer, a plurality of first inclined surfaces are formed on an interface between the first high refractive index layer and the first low refractive index layer, and each of the first inclined surfaces is inclined relative to a thickness direction of the base layer. The first low refractive index layer has a plurality of recessed microstructures, the first high refractive index layer fills the recessed microstructures of the first low refractive index layer so as to form a plurality of protruding microstructures on the first high refractive index layer, a shape of each of the protruding microstructures of the first high refractive index layers and a shape of each of the recessed microstructures of the first low refractive index layer cooperate with each other, and a refractive index of the first high refractive index layer is greater than a refractive index of the first low refractive index layer.

In yet another aspect, the present disclosure provides an optical film, which includes a base layer, a first optical structure and a second optical structure. The first optical structure is disposed on a light input side of the base layer and includes a first high refractive index layer and a first low refractive index layer, and the first high refractive index layer is located between the first high refractive index layer and the base layer. The second optical structure is disposed on a light output side of the base layer. The first low refractive index layer, a light input surface of the first high refractive index layer and a light output surface of the second optical structure respectively have a plurality of recessed microstructures, the recessed microstructures are recessed in a direction toward the base layer, and the recessed microstructure of the first low refractive index layer is filled by the first high refractive index layer, and a refractive index of the first high refractive index layer is greater than a refractive index of the first low refractive index layer.

One of the beneficial effects of the present disclosure is that the optical film and the light emitting module using the optical film can diffuse the light beams generated by the light emitting assembly in order to make the light beam output by the light emitting modules have a more uniform brightness distribution, by virtue of "the optical film being disposed above the light emitting units, and the optical film including a base layer and a first optical structure," "the first optical structure including a first high refractive index layer and a first low refractive index layer, and the first high refractive index layer being located between the light emitting assembly and the first low refractive index layer," and "the first inclined surfaces being formed on an interface between the first high refractive index layer and the first low refractive index layer, and each of the first inclined surfaces being inclined relative to a thickness direction of the base layer."

These and other aspects of the present disclosure can become apparent from the following description of the embodiment taken in conjunction with the following drawings and their captions, although variations and modifications therein can be affected without departing from the spirit and scope of the novel concepts of the disclosure.

BRIEF DESCRIPTION OF THE DRAWINGS

The described embodiments can be better understood by reference to the following description and the accompanying drawings, in which.

DETAILED DESCRIPTION OF THE EXEMPLARY EMBODIMENTS

Figure 1:
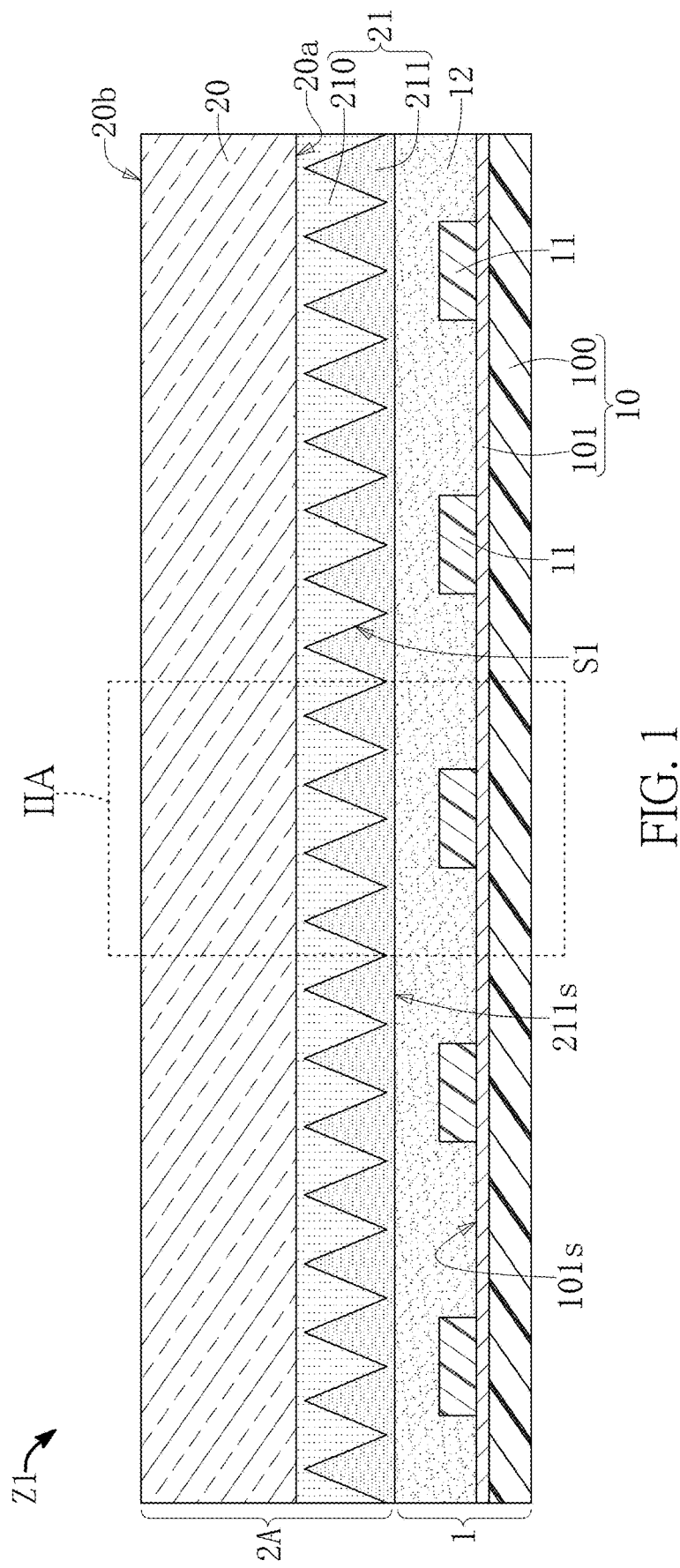
FIG. 1 is a partial schematic side view of a light emitting module according to a first embodiment of the present disclosure.

The present disclosure is more particularly described in the following examples that are intended as illustrative only since numerous modifications and variations therein can be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2A:
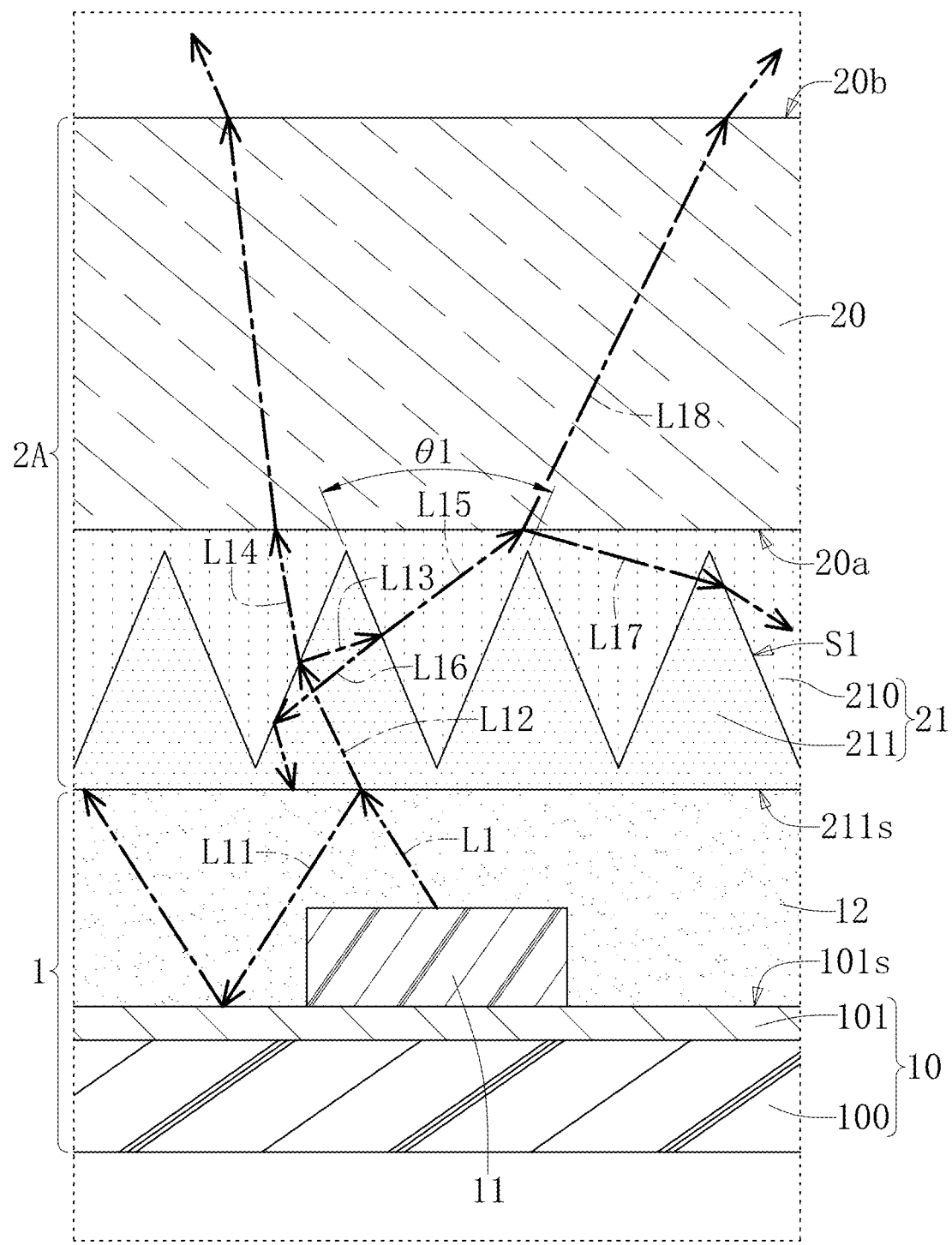
FIG. 2A is a partial schematic enlarged view of part IIA of FIG. 1 for showing a first optical path.

Referring to FIG. 1 and FIG. 2A, FIG. 1 is a partial schematic side view of the light emitting module according to the first embodiment of the present disclosure, and FIG. 2A is a partial schematic enlarged view of part IIA in FIG. 1. The light emitting module Z1 can be used in a backlight module of a display device, such as a direct-type backlight module, to uniformly (or evenly) diffuse the light source to a specific display area.

The light emitting module Z1 includes a light emitting assembly 1 and an optical film 2A. The light emitting assembly 1 includes a substrate 10 and a plurality of light emitting units 11 disposed on the substrate 10. The substrate 10 has a reflection surface 101s for reflecting light beams, and the light emitting units 11 are disposed on the reflection surface 101s. Furthermore, the substrate 10 of this embodiment includes a bottom plate 100 and a reflective layer 101 disposed on the bottom plate 100, and the light emitting units 11 are disposed on the reflective layer 101, but the present disclosure is not limited thereto. For example, the bottom plate 100 can be a ceramic bottom plate, a metal bottom plate or a composite bottom plate, which is not limited by the present disclosure. For example, the reflective layer 101 can be a metal coating layer or a coating layer with reflective white glue so as to reflect the light beams generated by the light emitting units 11.

The light emitting units 11 are disposed on the substrate 10 and arranged in an array to generate a point light source or a line light source. In addition, each light emitting unit 11 can be a micro light emitting diode (i.e., micro LED) or a sub-millimeter light emitting diode (i.e., mini LED), but the present disclosure is not limited thereto. In addition, in this embodiment, the light emitting assembly 1 further includes an encapsulation layer 12 (or a package layer 12), and the encapsulation layer 12 can cover each light emitting unit 11 so as to protect the light emitting unit 11.

The optical film 2A is adjacent to the light emitting assembly 1 and disposed on the light emitting units 11. In this embodiment, the optical film 2A is directly disposed on the encapsulation layer 12 of the light emitting assembly 1, but the present disclosure is not limited thereto. In another embodiment, the optical film 2A can also be spaced apart from the light emitting assembly 1 by a predetermined distance.

The optical film 2A can uniformly diffuse the light beam generated by the light emitting units 11. Furthermore, the optical film 2A can be used as a diffusion sheet or a brightness enhancement sheet to convert a point light source or a line light source into a surface light source. As shown in FIG. 1, the optical film 2A provided by the embodiment of the present disclosure includes a base layer 20 and a first optical structure 21. In one embodiment, the total thickness of the optical film 2A can range from 40 μm to 300 μm.

Furthermore, the optical film 2A has a light input side and a light output side opposite to the light input side. The first optical structure 21 can be located on the light input side or the light output side of the optical film 2A. In this embodiment, the first optical structure 21 is located on the light input side of the optical film 2A.

Furthermore, the base layer 20 has a first surface 20a and a second surface 20b opposite to the first surface 20a. In this embodiment, the first surface 20a of the base layer 20 faces the light emitting assembly 1. In this embodiment, the first optical structure 21 is disposed on the first surface 20a and is located on the light input side of the base layer 20. However, in another embodiment, the first optical structure 21 can also be disposed on the second surface 20b. In this embodiment, the thickness of the first optical structure 21 ranges from 5 μm to 100 μm.

In addition, the material constituting the base layer 20 can be polyethylene terephthalate (PET), polystyrene (PS), polycarbonate (PC), polyethylene (PE), polypropylene (PP), polyvinyl chloride (PVC), acrylic (PMMA), acrylic (MMA) and so on. The present disclosure is not limited thereto as long as the material constituting the base layer 20 can allow light beams to pass therethrough. In addition, the thickness of the base layer 20 can range from 30 μm to 250 μm, preferably 50 μm to 125 μm, which is easier to process.

In this embodiment, the first optical structure 21 includes a first low refractive index layer 210 and a first high refractive index layer 211. The first high refractive index layer 211 is located between the first low refractive index layer 210 and the light emitting assembly 1. Accordingly, the first high refractive index layer 211 has a light input surface 211s facing the light emitting assembly 1. In addition, the first high refractive index layer 211 can completely cover the first low refractive index layer 210. In this embodiment, the light input surface 211s of the first high refractive index layer 211 is a flat surface and is directly connected to the encapsulation layer 12 of the light emitting assembly 1, but the present disclosure is not limited thereto.

That is to say, the light beams generated by the light emitting units 11 can enter the optical film 2A through the light input surface 211s of the first high refractive index layer 211, and then pass through the first low refractive index layer 210 and the base layer 20, and then project out of the second surface 20b of the base layer 20.

In addition, in this embodiment, the refractive index of the base layer 20 is lower than the refractive index of the first high refractive index layer 211, but higher than the refractive index of the first low refractive index layer 210. In addition, in this embodiment, the refractive index of the encapsulation layer 12 of the light emitting assembly 1 is lower than the refractive index of the first high refractive index layer 211. For example, the refractive index of the encapsulation layer 12 can be 1.48, the refractive index of the first high refractive index layer 211 can be 1.61, the refractive index of the first low refractive index layer 210 can be 1.45, and the refractive index of the base layer 20 can be 1.57, but the present disclosure is not limited thereto.

Referring to FIG. 2A, it should be noted that the interface between the first high refractive index layer 211 and the first low refractive index layer 210 includes a plurality of first inclined surfaces S1, and each first inclined surface S1 is inclined relative to the thickness direction of the base layer 20. In this embodiment, every two first inclined surfaces S1 are connected together to form a first included angle θ1.

In this embodiment, the first included angle θ1, the refractive index of the first high refractive index layer 211 and the refractive index of the first low refractive index layer 210 satisfy or meet the following relationship: $\theta1 \leq (180 - 2*\arcsin(n10/n11))$, in which θ1 is the first included angle, n11 is the refractive index of the first high refractive index layer 211, and n10 is the refractive index of the first low refractive index layer 210. In this way, most of the light beams generated by the light emitting units 11 are initially projected onto the first inclined surface S1 at an angle greater than the critical angle of the total internal reflection, and then are totally reflected. The first included angle θ1 formed by the two connected first inclined surfaces S1 is smaller than a specific value, so that the light beams that are generated by the light emitting units 11 entering the first optical structure 21 at an inclination angle within 10 degrees relative to the optical axis of the light emitting unit 11 and projecting onto the first inclined surface S1 can be totally reflected.

In addition, in a preferred embodiment, the ratio R (R=n10/n11) between the refractive index n10 of the first low refractive index layer 210 and the refractive index n11 of the first high refractive index layer 211 ranges from 0.85 to 0.97, so that the optical film 2A can have a better light-diffusing effect. It should be noted that when the ratio R is higher than 0.97, the optical refraction effect is poor. In addition, when the ratio R is lower than 0.85, the first low refractive index layer 210 needs to use a fluorine-containing material. However, the fluorine-containing material of the first low refractive index layer 210 and the commonly used material (such as polymethyl methacrylate (PMMA)) of the first high refractive index layer 211 are difficult to combine and have poor matching.

It should be noted that when a light beam enters a medium with a relatively low refractive index (such as the first high refractive index layer 211) from a medium with a relatively high refractive index (the first low refractive index layer 210), and the incident angle of the light beam is greater than the critical angle, the beam can be totally reflected. Conversely, when a light beam enters a medium with a relatively high refractive index from a medium with a relatively low refractive index, the light beam cannot be totally reflected, but can be divided into a refracted light beam and a reflected light beam.

Therefore, the first high refractive index layer 211 is located between the first low refractive index layer 210 and the light emitting assembly 1, so that the probability of the light beam being totally reflected in the optical film 2A can be increased. On the other hand, the refractive index of the base layer 20 is higher than that of the first low refractive index layer 210, so that when the light beam enters the base layer 20 from the first low refractive index layer 210, the light beam cannot be totally reflected.

As shown in FIG. 2A, the first initial light beam L1 generated by a single light emitting unit 11 is taken as an example for description, but the light beam generated by the light emitting unit 11 is not limited thereto. In addition, in order to facilitate the description of the optical paths of the light beams in the optical film 2A, some of the refracted light beams or the reflected light beams are not shown in FIG. 2A.

When the first initial light beam L1 is projected onto the interface between the encapsulation layer 12 and the first high refractive index layer 211 (i.e., the light input surface 211s of the first high refractive index layer 211), a first reflected light beam L11 and a first transmitted light beam L12 are formed. The first reflected light beam L11 is projected onto the reflecting surface 101s of the light emitting assembly 1, and then is projected onto the first optical structure 21 through the reflecting surface 101s of the light emitting assembly 1.

The incident angle of the first transmitted light beam L12 projected onto the first inclined surface S1 is smaller than the critical angle of the total internal reflection, so that another first reflected light beam L13 and another first transmitted light beam L14 entering the first low refractive index layer 210 can be formed on the first inclined surface S1. The first transmitted light beam L14 is projected out of the optical film 2A after passing through the base layer 20. The first reflected light beam L13 is projected onto another first inclined surface S1 at an angle smaller than the critical angle of the total internal reflection, and then is further divided into a first transmitted light beam L15 and a first reflected light beam L16. It is should be noted that the incident angle of the first reflected light beam L16 projected onto another first inclined surface S1 is greater than the critical angle of the total internal reflection, so that the first reflected light beam L16 can be totally reflected.

The first transmitted light beam L15 is projected onto the first low refractive index layer 210 and then divided into a first transmitted light beam L18 and a first reflected light beam L17. The first transmitted light beam L18 is projected out of the optical film 2A through the base layer 20. The first reflected light beam L17 can continue to be transmitted between the first low refractive index layer 210 and the first high refractive index layer 211 through refraction, reflection and total internal reflection.

Figure 2B:
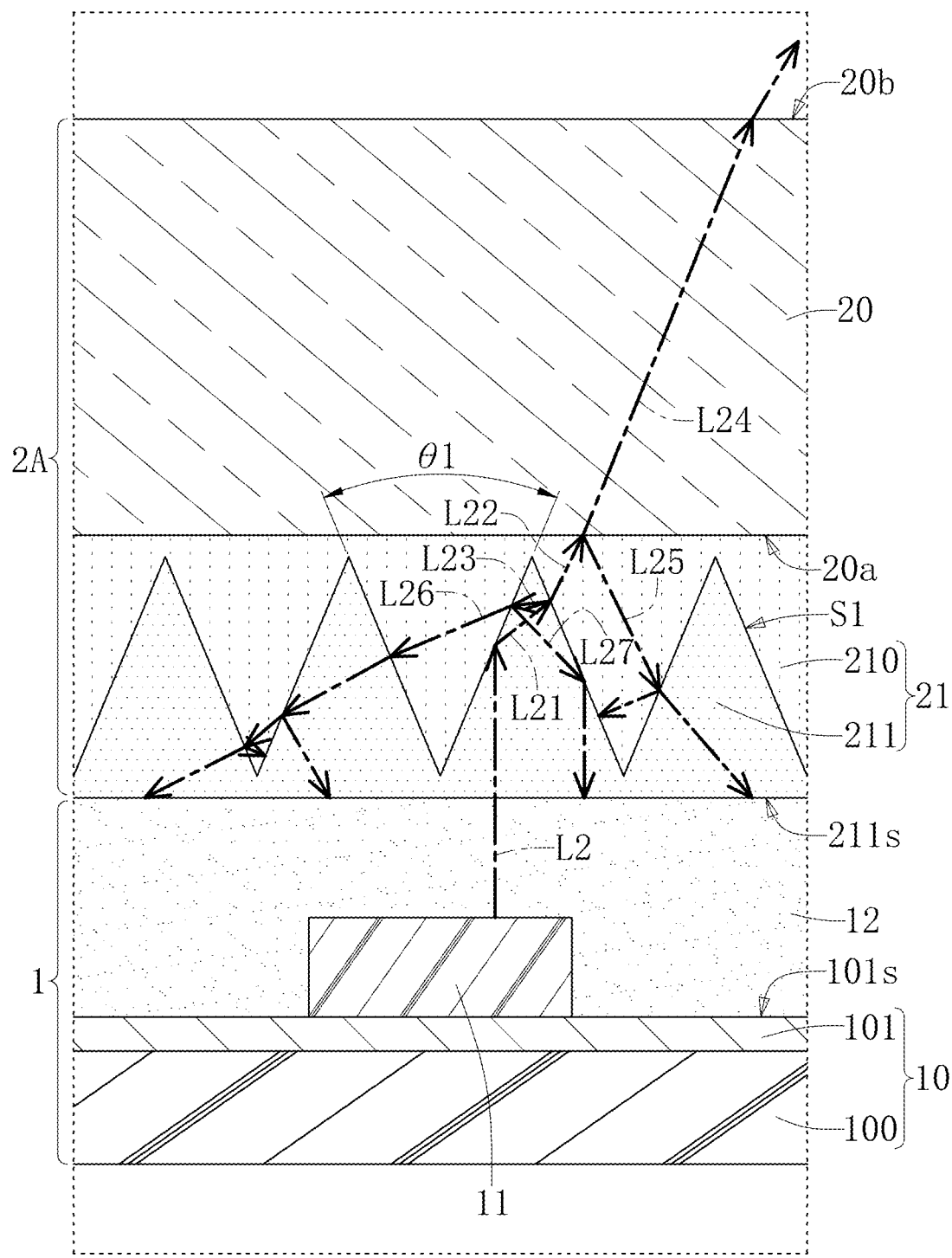
FIG. 2B is a partial schematic enlarged view of part IIA in FIG. 1 for showing a second optical path.

In addition, referring to FIG. 2B, taking the second initial light beam L2 generated by a single light emitting unit 11 as an example for description. Similarly, in order to facilitate the illustration of the optical path of the light beam in the optical film 2A, some of the refracted light beams or the reflected light beams are not shown in FIG. 2B. The second initial light beam L2 being perpendicular to the light input surface 211s enters the first high refractive index layer 211, and then is projected onto the first inclined surface S1. Since the incident angle of the second initial light beam L2 projected onto the first inclined surface S1 is greater than the critical angle of the total internal reflection, the second initial light beam L2 can be totally reflected to form a second total internal reflection light beam L21 without directly entering the first low refractive index layer 210.

After the second total internal reflection light beam L21 is projected onto another first inclined surface S1, the second total internal reflection light beam L21 is divided into a second transmitted light beam L22 and a second reflected light beam L23. After the second transmitted light beam L22 is projected onto the first surface 20a of the base layer 20, the second transmitted light beam L22 is divided into a second transmitted light beam L24 and a second reflected light beam L25. The second transmitted light beam L24 is projected out of the base layer 20, and the second reflected light beam L25 continues to be dispersed in the first optical structure 21 through reflection, refraction or total internal reflection.

In addition, the second reflected light beam L23 is reflected again and projected onto the first inclined surface S1, and then is divided into another second transmitted light beam L26 and another second reflected light beam L27. The second transmitted light beam L26 can be transmitted between the first high refractive index layer 211 and the first low refractive index layer 210 and within the first optical structure 21 through multiple refractions, reflections or total internal reflections.

Therefore, the second reflected light beam L23 is repeatedly refracted, reflected or totally reflected at the interface between the first low refractive index layer 210 and the first high refractive index layer 211, and can be transmitted laterally within the first optical structure 21 for a certain distance. The second reflected light beam L27 is projected onto the first inclined surface S1 at an incident angle greater than the critical angle of the total internal reflection, and then is totally reflected. In addition, it should be noted that most of the light beams entering the optical film 2A are nearly perpendicular to the light input surface 211s and enter the first high refractive index layer 211, such as the second initial light beam L2 that are diffused through refraction, reflection or total internal reflection. Accordingly, the optical film 2A provided in this embodiment can effectively diffuse the point light sources generated by the light emitting assembly 1.

The surface profile of the first low refractive index layer 210 and the surface profile of the first high refractive index layer 211 can match each other. The first low refractive index layer 210 has a plurality of microstructures, and each microstructure can be a triangular column, a trapezoidal column, an arcuate column, a convex pyramid, a concave pyramid or other pyramids, but the present disclosure is not limited thereto.

Figure 3:
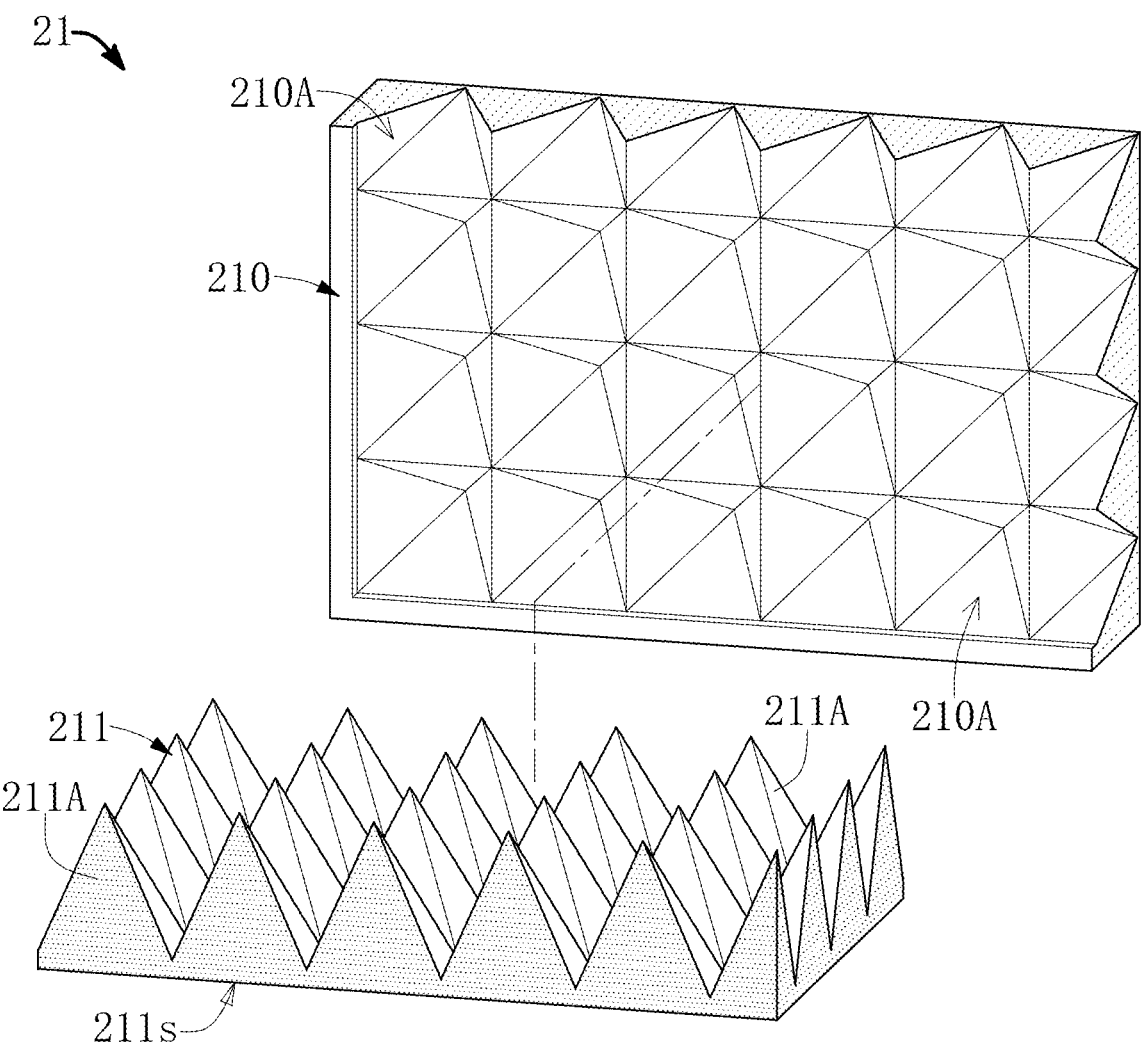
FIG. 3 is a partial schematic perspective exploded view of a first optical structure according to an embodiment of the present disclosure.

Referring to FIG. 3, which is a partial schematic perspective exploded view of the first optical structure according to an embodiment of the present disclosure. In this embodiment, the first low refractive index layer 210 has a plurality of recessed microstructures 210A, and the recessed microstructures 210A is filled by a first high refractive index layer 211. In detail, the first low refractive index layer 210 with the recessed microstructures 210A can be fabricated in advance, and then a high refractive index adhesive material is filled into the recessed microstructures 210A to form the first high refractive index layer 211. Therefore, the first high refractive index layer 211 can be provided with a plurality of protruding microstructures 211A.

Accordingly, the shapes of the recessed microstructures 210A of the first low refractive index layer 210 and the protruding microstructures 211A of the first high refractive index layer 211 can match with each other. In this embodiment, the recessed microstructures 210A are concave pyramid microstructures, and the protruding microstructures 211A are convex pyramid microstructures. The recessed microstructure 210A can include four triangular bevels (or triangular inclined planes) connected with each other, and the four triangular bevels can be connected to each other so that the recessed microstructure 210A has a closed opening, which is helpful to make the light beam entering the first optical structure 21 be reflected and refracted more times. In another embodiment, each recessed microstructure 210A (or each protruding microstructure 211A) can also have three triangular inclined surfaces, but the present disclosure is not limited thereto.

After the light beam generated by one of the light emitting units 11 enters the first optical structure 21, the light beam can be transmitted laterally within the first optical structure 21 for a certain distance through multiple reflections and refractions, and then enter the base layer 20. In this way, the light uniformity of the optical film 2A can be increased.

Figure 4:
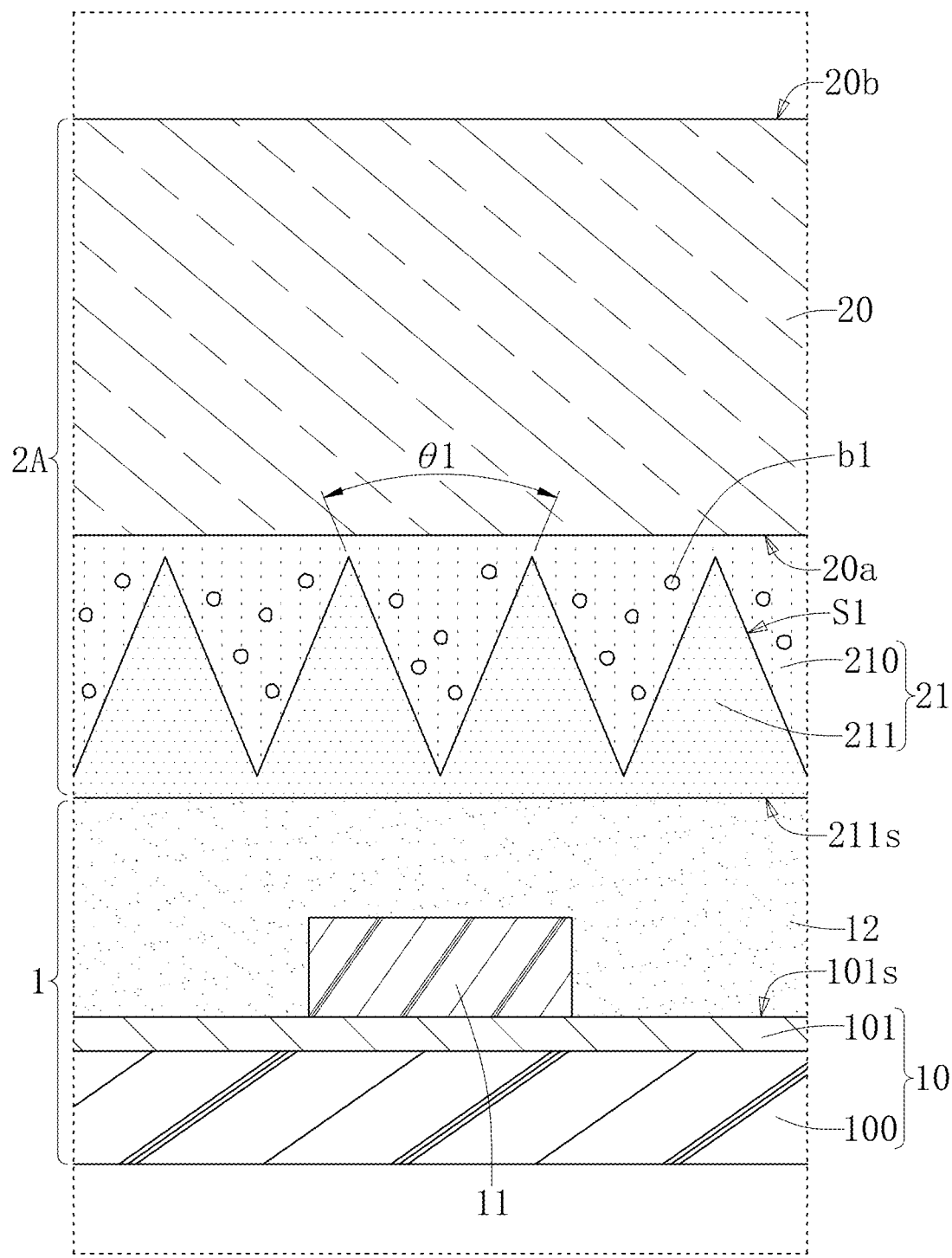
FIG. 4 is a partial schematic enlarged view of the light emitting module according to another embodiment of the present disclosure.

Referring to FIG. 4, which is a partial schematic side view of the light emitting module according to another embodiment of the present disclosure. The same components in this embodiment and the light emitting module Z1 in the previous embodiment have the same reference numerals, and the same parts will not be repeated. The first optical structure 21 of this embodiment has a plurality of bubbles b1 (or air bubbles). In detail, at least one of the first low refractive index layer 210 and the first high refractive index layer 211 has a plurality of bubbles b1 randomly dispersed therein.

In one embodiment, the bubbles b1 are microbubble or ultrafine bubbles. Furthermore, at least 90% of the bubbles b1 have a bubble diameter of less than 10 μm, preferably less than 1 μm. Accordingly, the average bubble diameter of the bubbles b1 is also less than 10 μm, preferably less than 1 μm. Since the shape of each bubble b1 is not necessarily a circle, in the present disclosure, the bubble diameter of the bubbles b1 refers to the average value of the maximum diameter and the minimum diameter of the individual bubble b1. In addition, the average bubble diameter means the average value of the bubble diameters of all the bubbles b1.

Furthermore, the area distribution density of the bubbles b1 is larger than or equal to 100/mm$^2$ (i.e., number of bubbles per square millimeter). In addition, the volume distribution density of the bubbles b1 is at least 1000/mm$^3$ (i.e., number of bubbles per cubic millimeter). The medium filled into the bubbles b1 can be air, nitrogen, helium, neon, carbon dioxide or any combination thereof. However, in another embodiment, the first high refractive index layer 211 can also have a plurality of dispersed bubbles b1, but the first low refractive index layer 210 and the base layer 20 have almost no bubbles. In yet another embodiment, both the first low refractive index layer 210 and the first high refractive index layer 211 can have bubbles b1.

It should be noted that when the light beam enters the optically denser medium (such as an optical film 2A) from the optically thinner medium (such as air), the refraction angle of the light beam can be smaller than the incident angle. Conversely, when the light beam enters the optically thinner medium from the optically denser medium, the refraction angle of the light beam can be greater than the incident angle. Since the bubbles b1 are distributed at a high density inside the first optical structure 21, the first optical structure 21 can have different transmission media for the light beam. Therefore, when the light beam is transmitted inside the first optical structure 21, it is easy for the light beam between different medium interfaces to refract, reflect and scatter in different angles and directions (that is to say, multi-angle and multi-directional refraction, reflection and scattering easily occur between different medium interfaces), thereby further enhancing the effect of diffusing the light beam.

Figure 5:
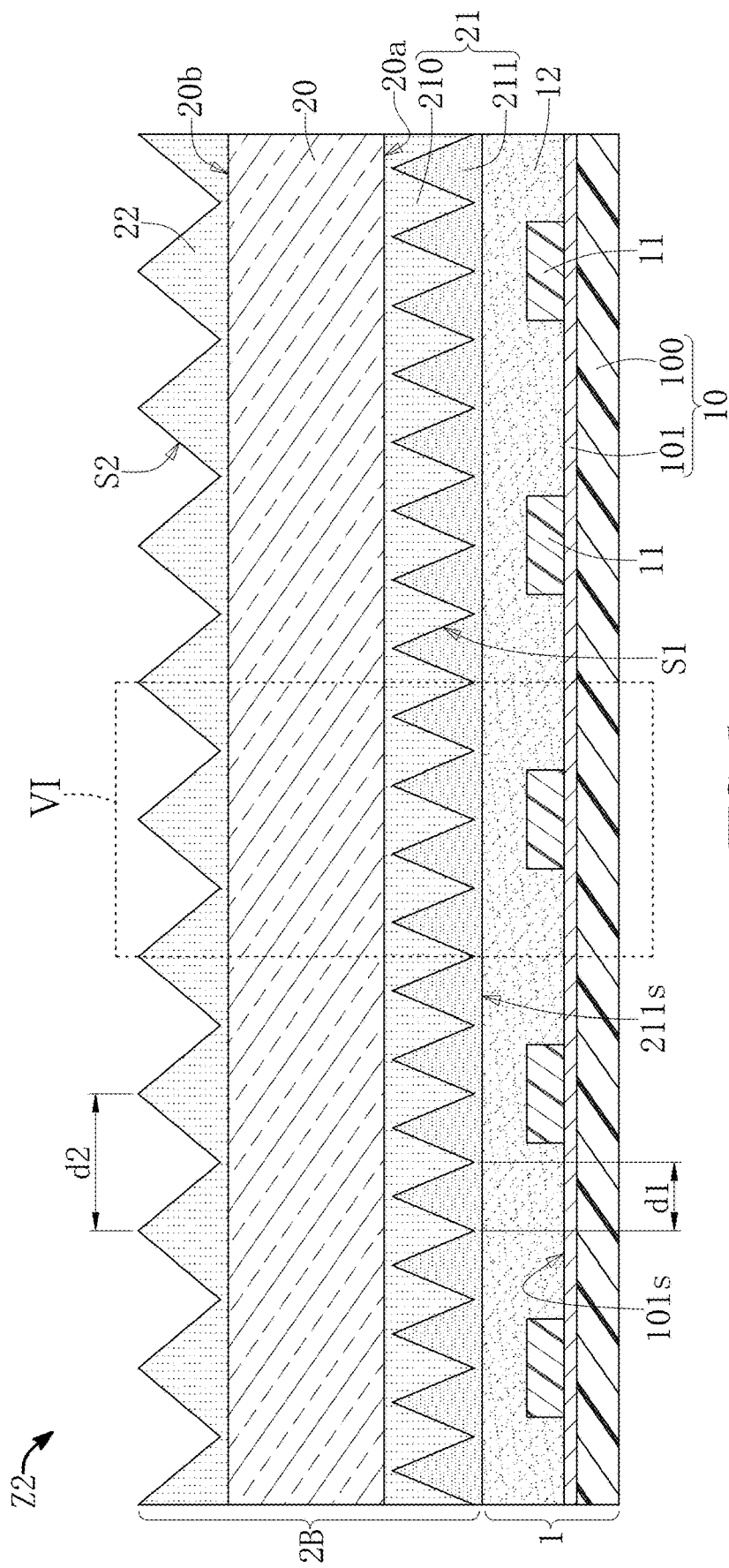
FIG. 5 is a partial schematic side view of the light emitting module according to a second embodiment of the present disclosure.
Figure 6:
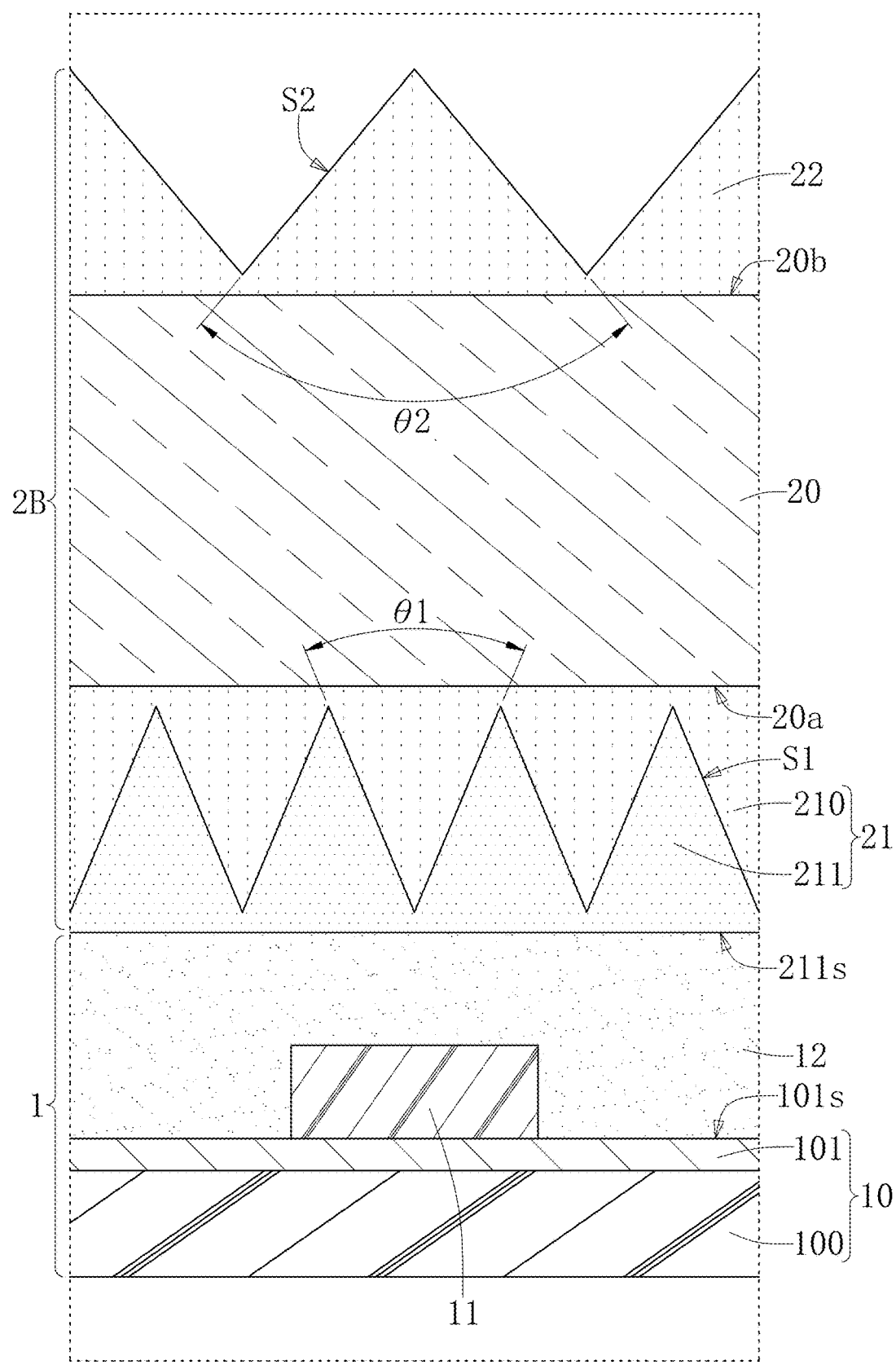
FIG. 6 is a partial schematic enlarged view of part VI in FIG. 5.

Referring to FIG. 5 to FIG. 6, FIG. 5 is a partial schematic side view of the light emitting module according to the second embodiment of the present disclosure, and FIG. 6 is a partial schematic enlarged view of part VI in FIG. 5. The light emitting module Z2 of the present embodiment has the same components as the light emitting module Z1 of the previous embodiment, and has the same reference numerals, and the same parts are not repeated.

The optical film 2B of this embodiment includes a base layer 20, a first optical structure 21 and a second optical structure 22. The first optical structure 21 and the second optical structure 22 are respectively located on two opposite sides of the base layer 20. In detail, the second optical structure 22 is located on the second surface 20b of the base layer 20 (i.e., the light emitting side of the optical film 2B).

As shown in FIG. 5 and FIG. 6, the second optical structure 22 includes a plurality of second inclined surfaces S2, and a second included angle θ2 is formed between every two second inclined surfaces S2 connected with each other. In this embodiment, the second included angle θ2 can be greater than or equal to the first included angle θ1. In detail, the second optical structure 22 includes a plurality of microstructures, and each microstructure can be a triangular column, a trapezoidal column, an arcuate column, a semicircular column, a convex pyramid, a concave pyramid, a pyramid or a hemisphere, but the present disclosure is not limited thereto.

As shown in FIG. 5, in this embodiment, the first distance d1 between any two microstructures of the first low refractive index layer 210 can be less than or equal to the second distance d2 between any two microstructures of the second optical structure 22. In addition, the cross-sectional width of the microstructures of the second optical structure 22 can be greater than or equal to the cross-sectional width of the microstructures of the first low refractive index layer 210.

As shown in FIG. 6, in order to increase the diffusion angle of the light beam (the incident light), the first optical structure can be a matte structure. For example, adding diffusion particles into the optical structure or manufacturing microstructures on the light input surface 211s to produce a fog effect, so that the haze of the matte structure can range from 3% to 30%. When the haze is less than 3%, the diffusion effect is poor. When the haze is greater than 30%, the light transmittance becomes poor.

Figure 7:
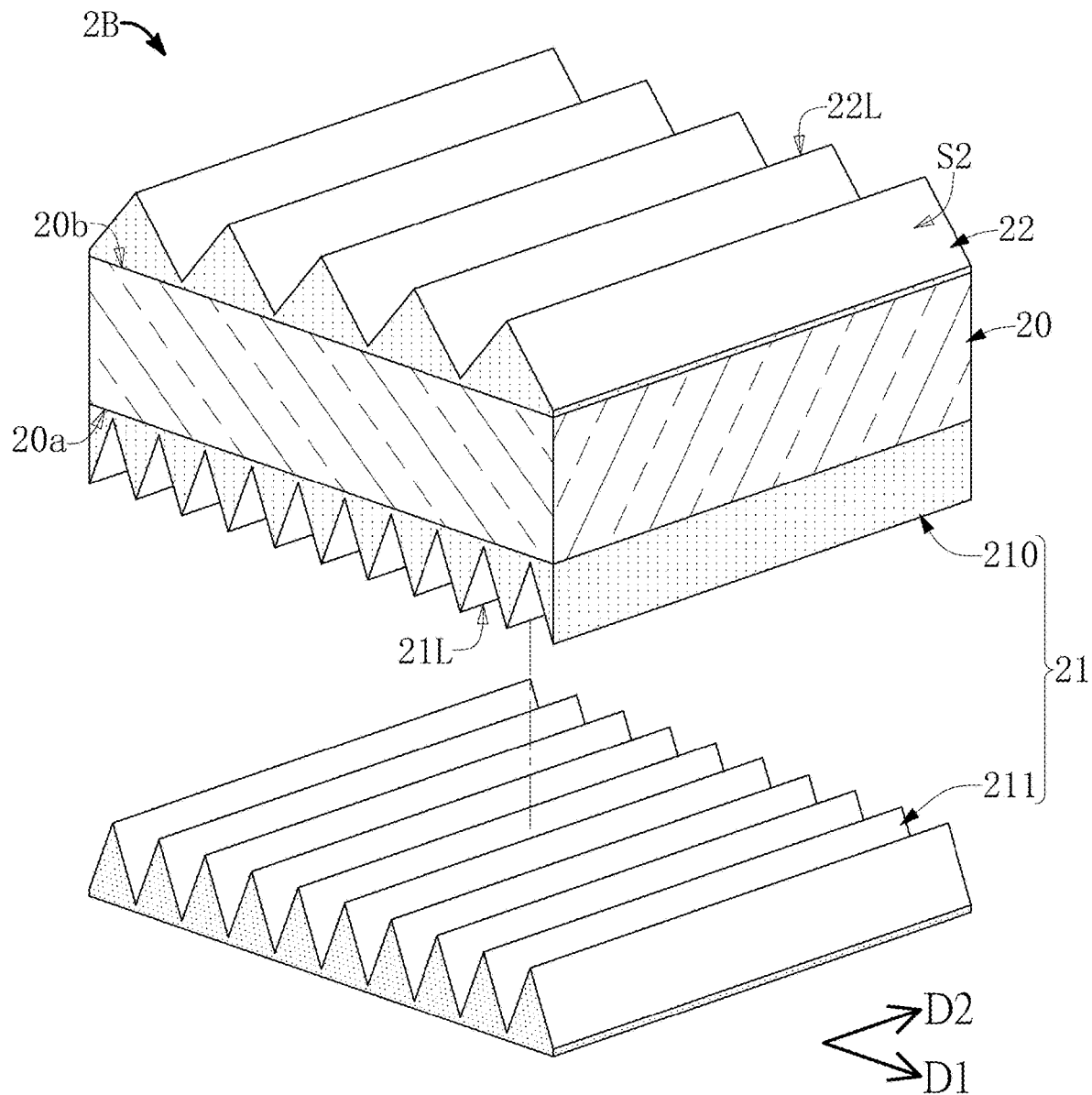
FIG. 7 is a partial schematic perspective exploded view of an optical film according to an embodiment of the present disclosure.
Figure 8:
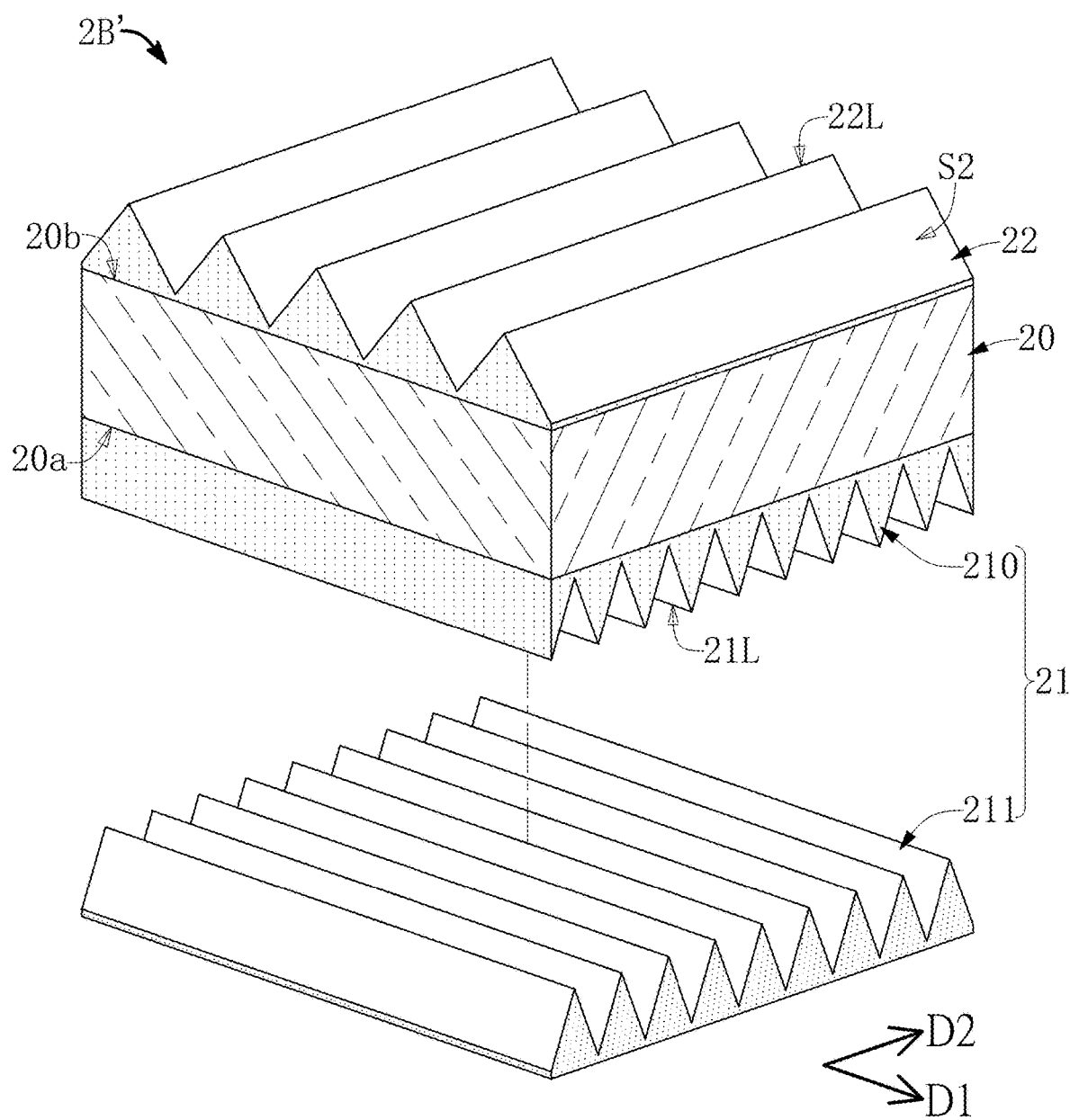
FIG. 8 is a partial schematic perspective exploded view of the optical film according to another embodiment of the present disclosure.

Referring to FIG. 7 and FIG. 8. FIG. 7 shows a partial perspective view of the optical film according to an embodiment of the present disclosure. In the embodiment shown in FIG. 7, the second optical structure 22 includes a plurality of triangular posts, which have a second ridge line 22L (or a second prism line) extended along the second direction D2. The first low refractive index layer 210 includes a plurality of triangular posts having a first ridge line 21L (or a first prism line) extending along the second direction D2. FIG. 8 shows a partial perspective view of the optical film according to another embodiment of the present disclosure. The main difference between the embodiment in FIG. 8 and the embodiment in FIG. 7 is the extending direction of the protruding posts. In the optical film 2B' of this embodiment, the first protruding post microstructures of the first low refractive index layer 210 are arranged side by side in the second direction D2, and each of the first convex post microstructures extends along the first direction D1. However, the second protrusion microstructures of the second optical structure 22 are arranged side by side in the first direction D1, and each of the second protrusion microstructures extends along the second direction D2.

Figure 9:
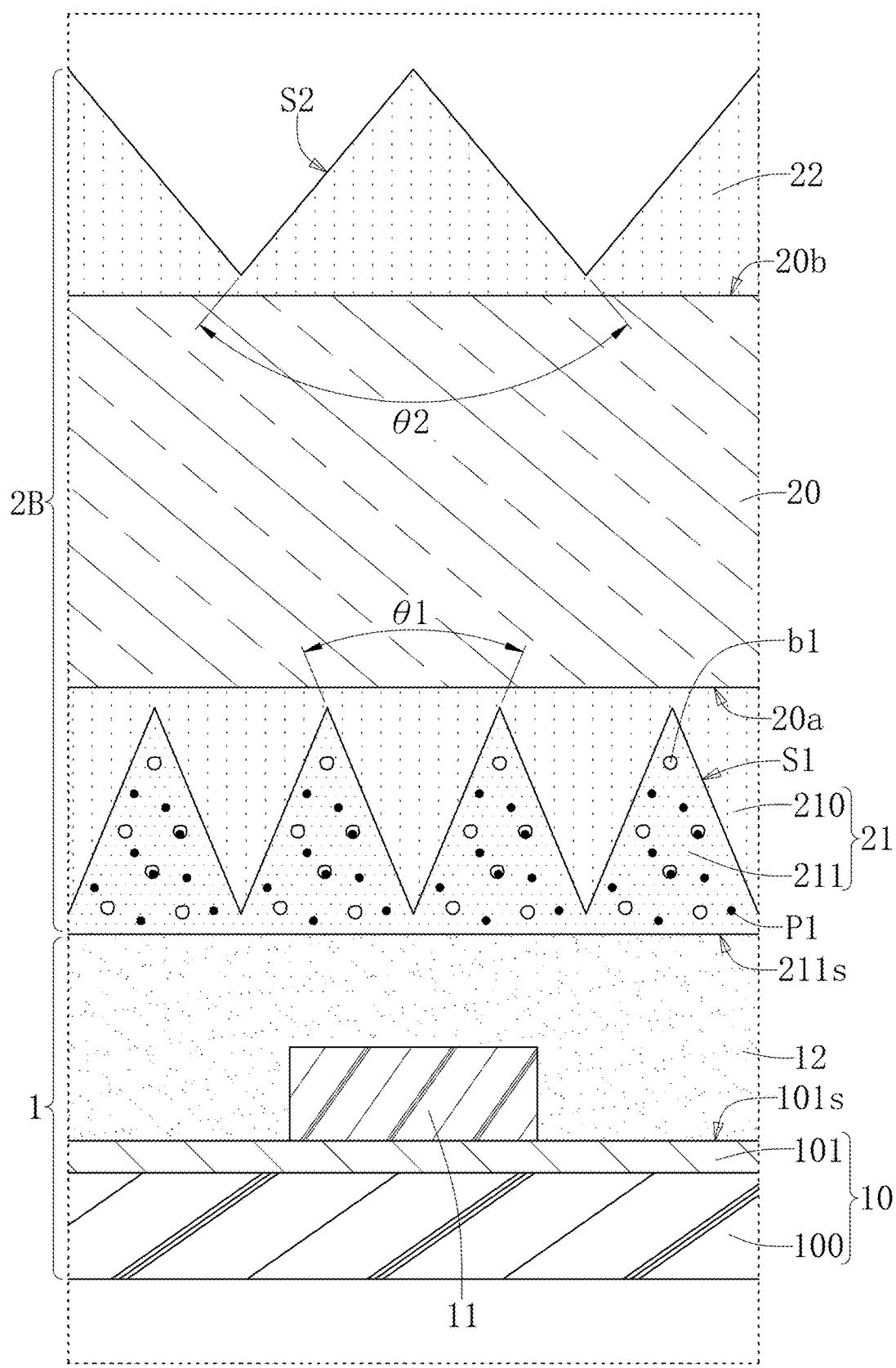
FIG. 9 is a partial schematic enlarged view of the light emitting module according to another embodiment of the present disclosure.

Referring to FIG. 9, which shows a partial schematic enlarged view of the light emitting module according to different embodiments of the present disclosure. The same or similar components of the embodiment shown in FIG. 9 and the embodiment of FIG. 6 have the same reference numerals, and the same parts will not be repeated.

At least one of the second optical structure 22, the first low refractive index layer 210 and the first high refractive index layer 211 has a plurality of bubbles b1 and a plurality of nanoparticles P1 randomly dispersed in the inside thereof, and at least one of the nanoparticles P1 and one of the bubbles b1 can be combined. In this embodiment, the first high refractive index layer 211 is taken as an example for description. As described above, the bubbles b1 can include microbubbles, ultrafine bubbles, or a mixture thereof. Furthermore, at least 90% of the bubbles b1 have a bubble diameter of less than 10 μm, preferably less than 1 μm.

In addition, in this embodiment, a part of the nanoparticles P1 can be combined with the corresponding bubbles b1. When the nanoparticle P1 is combined with the corresponding bubble b1, the bubble b1 combined with the nanoparticle P1 cannot dissolve in the colloid, ensuring the existence of the bubble b1. In detail, the nanoparticle P1 combined with the bubble b1 is usually close to the edge of the bubble b1 and is located inside the bubble b1, but the present disclosure is not limited thereto. The few nanoparticles P1 combined with the bubble b1 are located outside the bubble b1, but still close to the edge of the bubble b1.

It should be noted that not all the nanoparticles P1 can be combined with the bubble b1. That is to say, some of the bubbles b1 can be dispersed in the first high refractive index layer 211 individually. On the other hand, some nanoparticles P1 that are not combined with the bubbles b1 can be dispersed in the first high refractive index layer 211 individually. In addition, in the present disclosure, it is not limited that one bubble b1 is only combined with one nanoparticle P1, and it is also possible that one bubble b1 can be combined with two or more nanoparticles P1.

In one embodiment, among the nanoparticles P1, the particle diameter of 90% of the nanoparticles P1 is not more than 100 nm, preferably 30 nm to 50 nm. Accordingly, the average particle diameter of the nanoparticles P1 is not more than 100 nm, preferably 30 nm to 50 nm. In the present disclosure, the particle diameter of the nanoparticle P1 refers to the average value of the maximum diameter and the minimum diameter of the individual nanoparticle P1.

In addition, the average particle diameter of the nanoparticles P1 refers to the average value of the particle diameters of all the nanoparticles P1. In addition, the nanoparticles P1 can be nano-metals, nano-oxides or nano-diamonds. In a preferred embodiment, the material of the nanoparticles P1 can be silicon dioxide or titanium dioxide. The first optical structure 21 includes a plurality of nanoparticles P1 dispersed in the inside thereof, which can also improve the light-diffusing effect.

Figure 10:
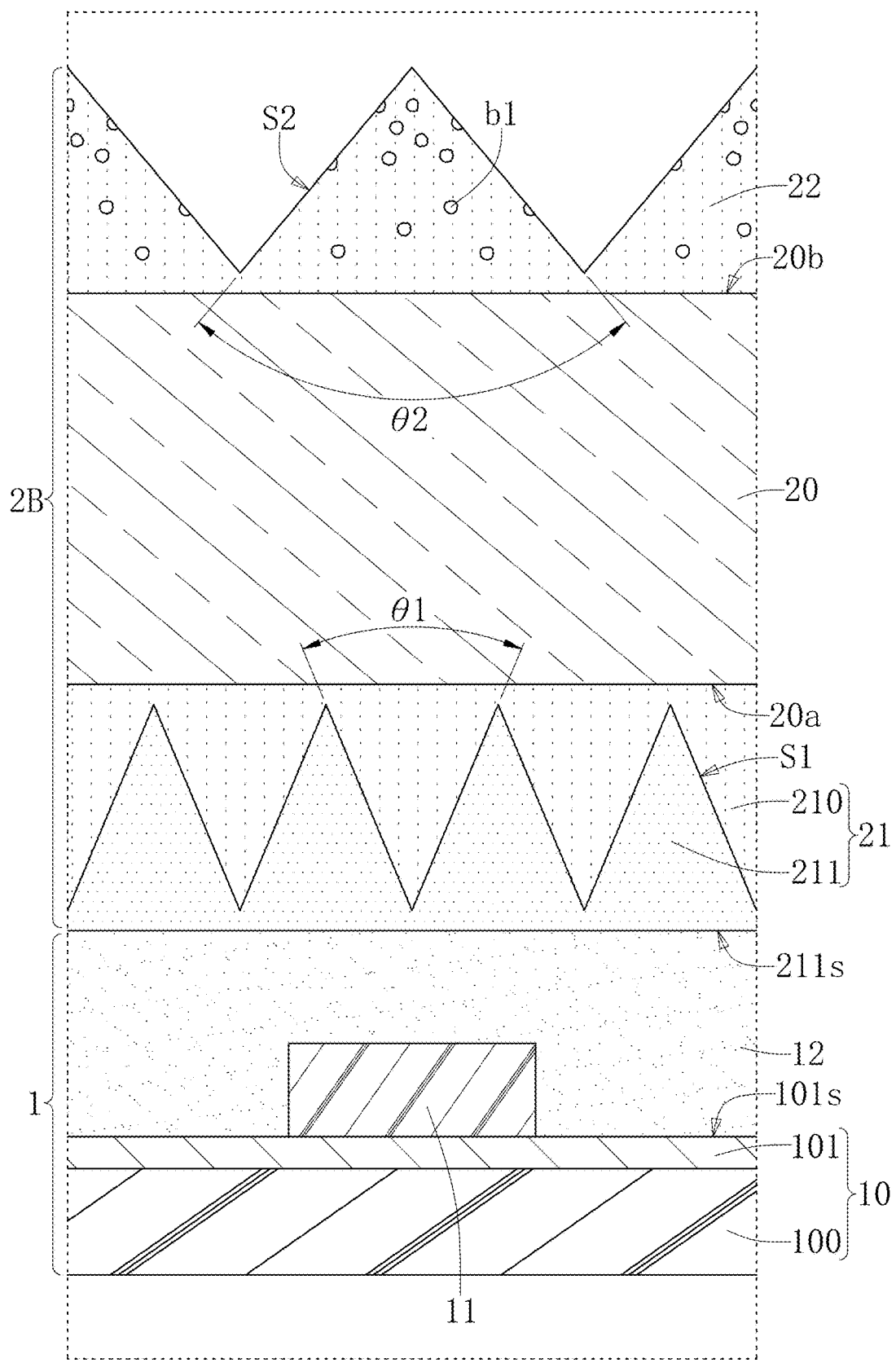
FIG. 10 is a partial schematic enlarged view of the light emitting module according to another embodiment of the present disclosure.

Referring to FIG. 10, in the optical film 2B according to another embodiment of the present disclosure, at least one of the second optical structure 22, the first low refractive index layer 210 and the first high refractive index layer 211 can have a plurality of bubble b1 randomly dispersed in the inside thereof. In this embodiment, the second optical structure 22 having the bubble b1 is taken as an example for description. In each microstructure of the second optical structure 22, the volume distribution density (number of bubbles per unit volume) of the bubbles b1 is decreased from the top of the microstructure of the second optical structure 22 toward the base layer 20.

Furthermore, the part of the microstructure of the second optical structure 22 above half the height (i.e., more than half of the microstructure of the second optical structure 22) is defined as the upper half of the microstructure of the second optical structure 22, and the part of the microstructure of the second optical structure 22 below the half height (i.e., less than half of the microstructure of the second optical structure 22) is defined as the lower half of the microstructure of the second optical structure 22. Accordingly, the volume distribution density of the bubbles b1 in the upper half of each microstructure of the second optical structure 22 is greater than the volume distribution density in the lower half of each microstructure of the second optical structure 22.

Figure 11:
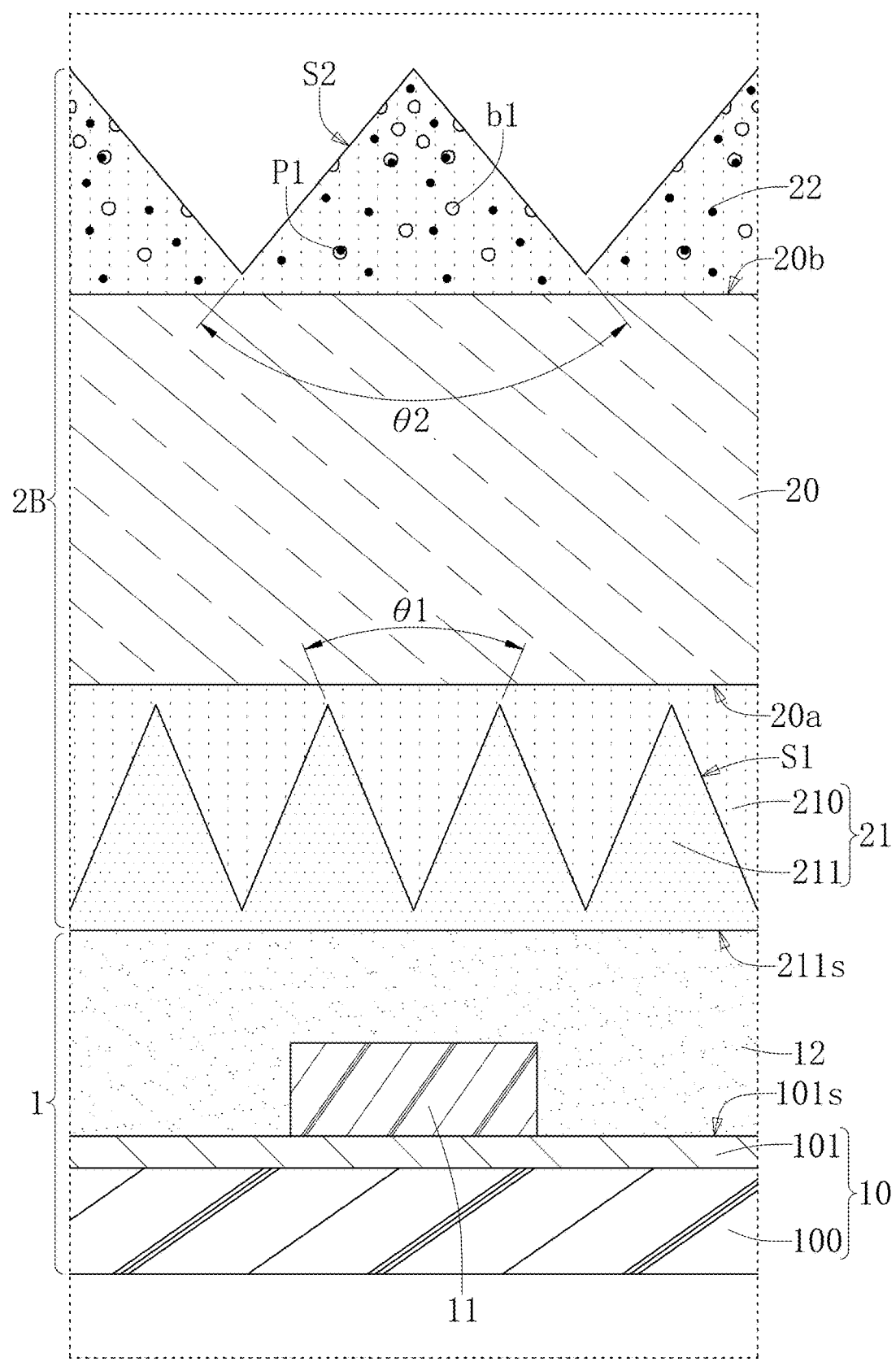
FIG. 11 is a partial schematic enlarged view of the light emitting module according to another embodiment of the present disclosure.

Referring to FIG. 11, in the optical film 2B according to another embodiment of the present disclosure, the second optical structure 22 can have a plurality of bubbles b1 and nanoparticles P1, and at least one nanoparticle P1 is combined with the bubble b1 to improve the light-diffusing effect. The range of the bubble diameter of the bubble b1 and the particle diameter and the material of the nanoparticle P1 have been described above, and will not be repeated.

Figure 12:
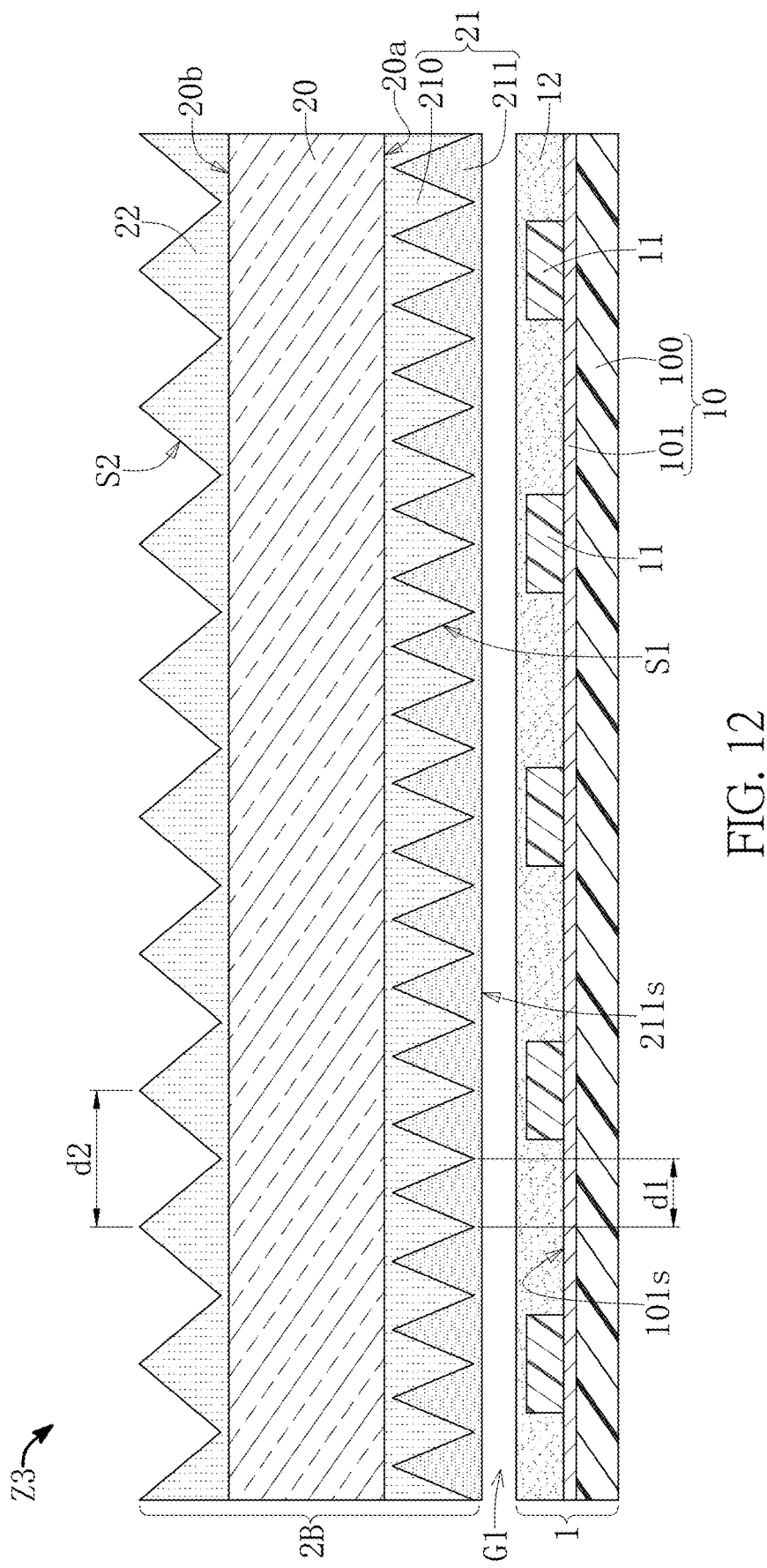
FIG. 12 is a partial schematic side view of the light emitting module according to a third embodiment of the present disclosure.

Referring to FIG. 12, which shows a partial side view of the light emitting module according to the third embodiment of the present disclosure. The same components of the light emitting module Z3 of the present embodiment and the light emitting module Z2 of the second embodiment have the same reference numerals, and the same parts will not be repeated. The difference between the present embodiment and the second embodiment is that the optical film 2B and the light emitting assembly 1 are arranged separately from each other. That is to say, a gap G1 is defined between the optical film 2B and the encapsulation layer 12 of the light emitting assembly 1, and the gap G1 can be filled with air.

Furthermore, the light input surface 211s of the first high refractive index layer 211 is not adjacent to the encapsulation layer 12 of the light emitting assembly 1. Since the difference between the refractive index of air and the refractive index n10 of the first high refractive index layer 211 is large, it is helpful to diffuse the light beam.

Figure 13:
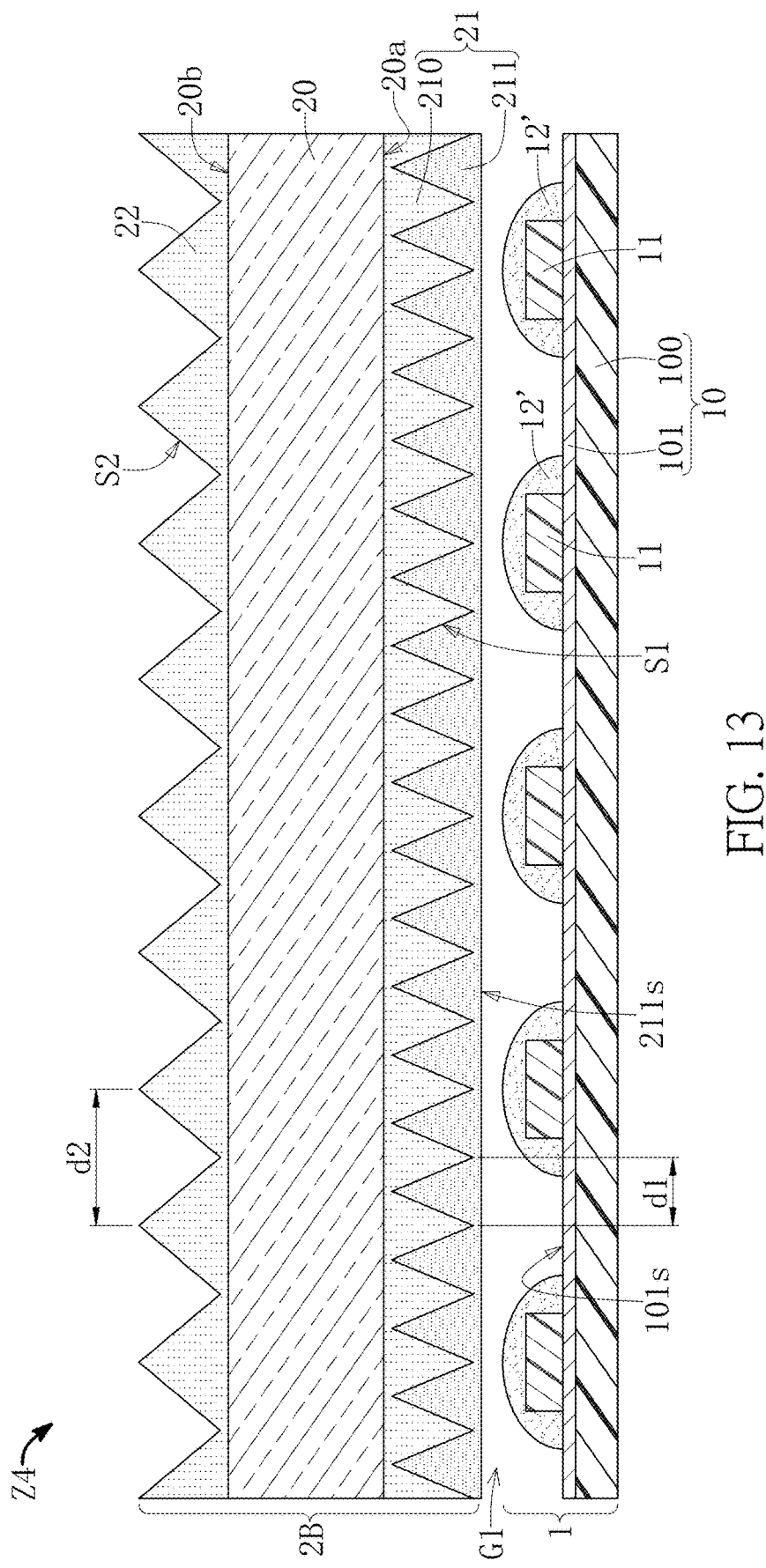
FIG. 13 is a partial schematic side view of the light emitting module according to a fourth embodiment of the present disclosure.

Referring to FIG. 13, which is a partial schematic side view of the light emitting module according to the fourth embodiment of the present disclosure. The same components of the light emitting module Z4 of the present embodiment and the light emitting module Z3 of the third embodiment have the same reference numerals, and the same parts will not be repeated. In this embodiment, the encapsulation layer 12' of the light emitting assembly 1 does not completely cover the reflective surface 101s of the substrate 10. Furthermore, the encapsulation layer 12' includes a plurality of parts separated from each other, and each part of the encapsulation layer 12' covers the corresponding light emitting unit 11.

In addition, the optical film 2A and the light emitting assembly 1 are also disposed apart from each other so as to define a gap G1, and the gap G1 can be filled with air, but the present disclosure is not limited thereto. In another embodiment, the optical film 2A can also partially contact the encapsulation layer 12. That is to say, a plurality of gaps can be defined between the light input surface 211s of the first high refractive index layer 211 and the encapsulation layer 12'.

Figure 14:
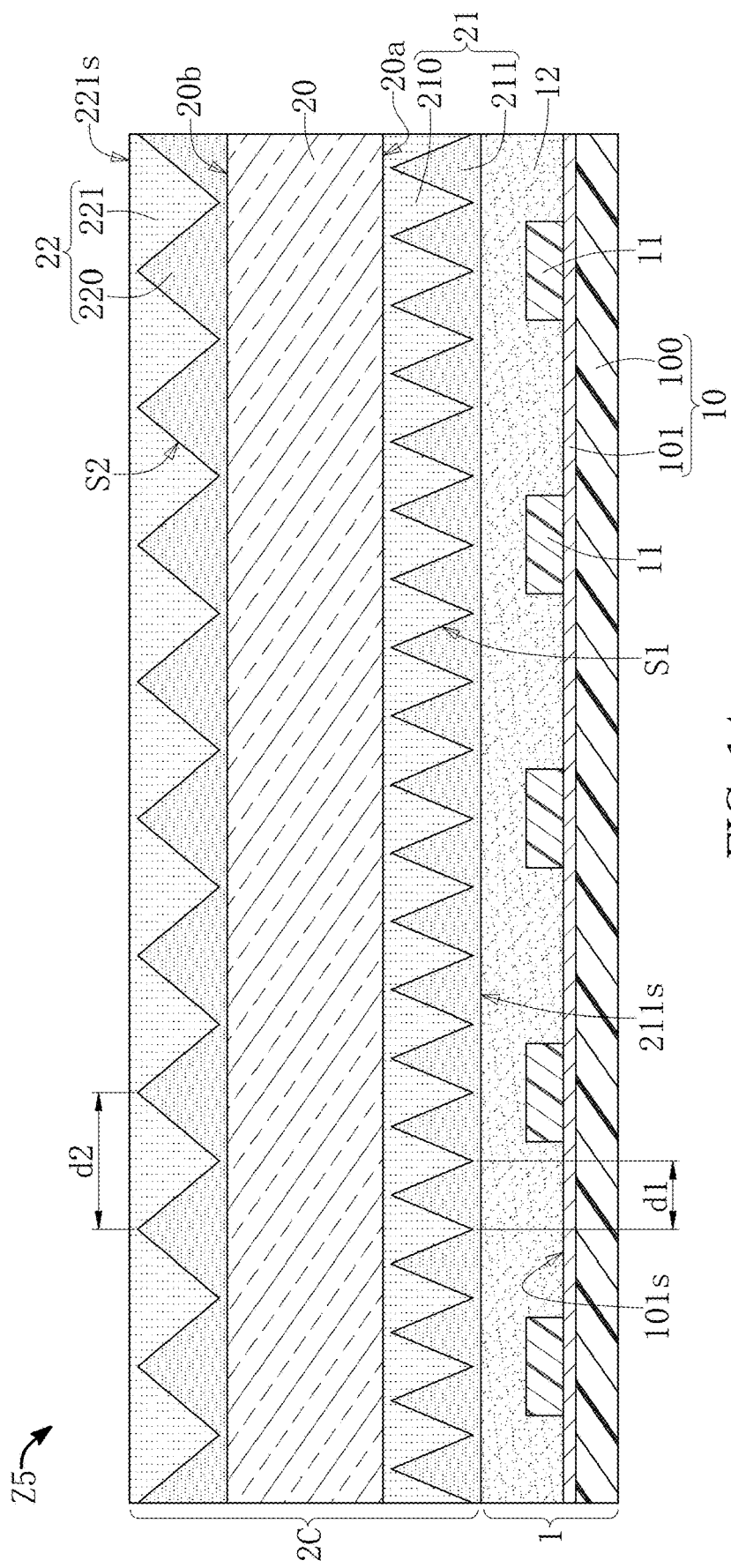
FIG. 14 is a partial schematic side view of the light emitting module according to a fifth embodiment of the present disclosure.

Referring to FIG. 14, which is a partial schematic side view of the light emitting module according to the fifth embodiment of the present disclosure. The same components of the light emitting module Z5 of the present embodiment and the light emitting module Z2 of the second embodiment have the same reference numerals, and the same parts will not be repeated.

In this embodiment, the optical film 2C includes a base layer 20, a first optical structure 21 and a second optical structure 22. The second optical structure 22 includes a second high refractive index layer 220 and a second low refractive index layer 221. The second high refractive index layer 220 is located between the second low refractive index layer 221 and the base layer 20. That is to say, in this embodiment, the light beam passing through the base layer 20 can enter the second high refractive index layer 220 firstly, and then enter the second low refractive index layer 221. When the incident angle of the light beam incident at the interface between the second high refractive index layer 220 and the second low refractive index layer 221 is greater than the critical angle of the total internal reflection, the light beam can also be totally reflected. Accordingly, the light beam can also be refracted and reflected multiple times in the second optical structure 22 so as to be laterally transmitted, so that the optical film 2C has a better light-diffusing effect.

The refractive index of the second high refractive index layer 220 is greater than that of the second low refractive index layer 221. In addition, the surface profile of the second high refractive index layer 220 and the surface profile of the second low refractive index layer 221 are matched with each other. The interface between the second high refractive index layer 220 and the second low refractive index layer 221 includes a plurality of second inclined surfaces S2, and each of the second inclined surfaces S2 is inclined with respect to the thickness direction of the base layer 20.

As shown in FIG. 14, the second high refractive index layer 220 has a plurality of microstructures. The second distance d2 between the two adjacent microstructures of the second high refractive index layer 220 is greater than the first distance d1 between the two adjacent microstructures of the first low refractive index layer 210, but the present disclosure is not limited thereto. In addition, the second low refractive index layer 221 covers the second high refractive index layer 220 and has an outer surface 221s. In this embodiment, the outer surface 221s is the light emitting surface of the optical film 2C, and is a flat surface.

In this embodiment, by placing the second high refractive index layer 220 of the second optical structure 22 between the base layer 20 and the second low refractive index layer 221, the number of the total internal reflection of the light beam projected onto the second inclined surface S2 can be increased, and the light beam can be transmitted laterally within the second optical structure 22. In this way, the light-diffusing effect of the optical film 2C can be further improved.

Figure 15:
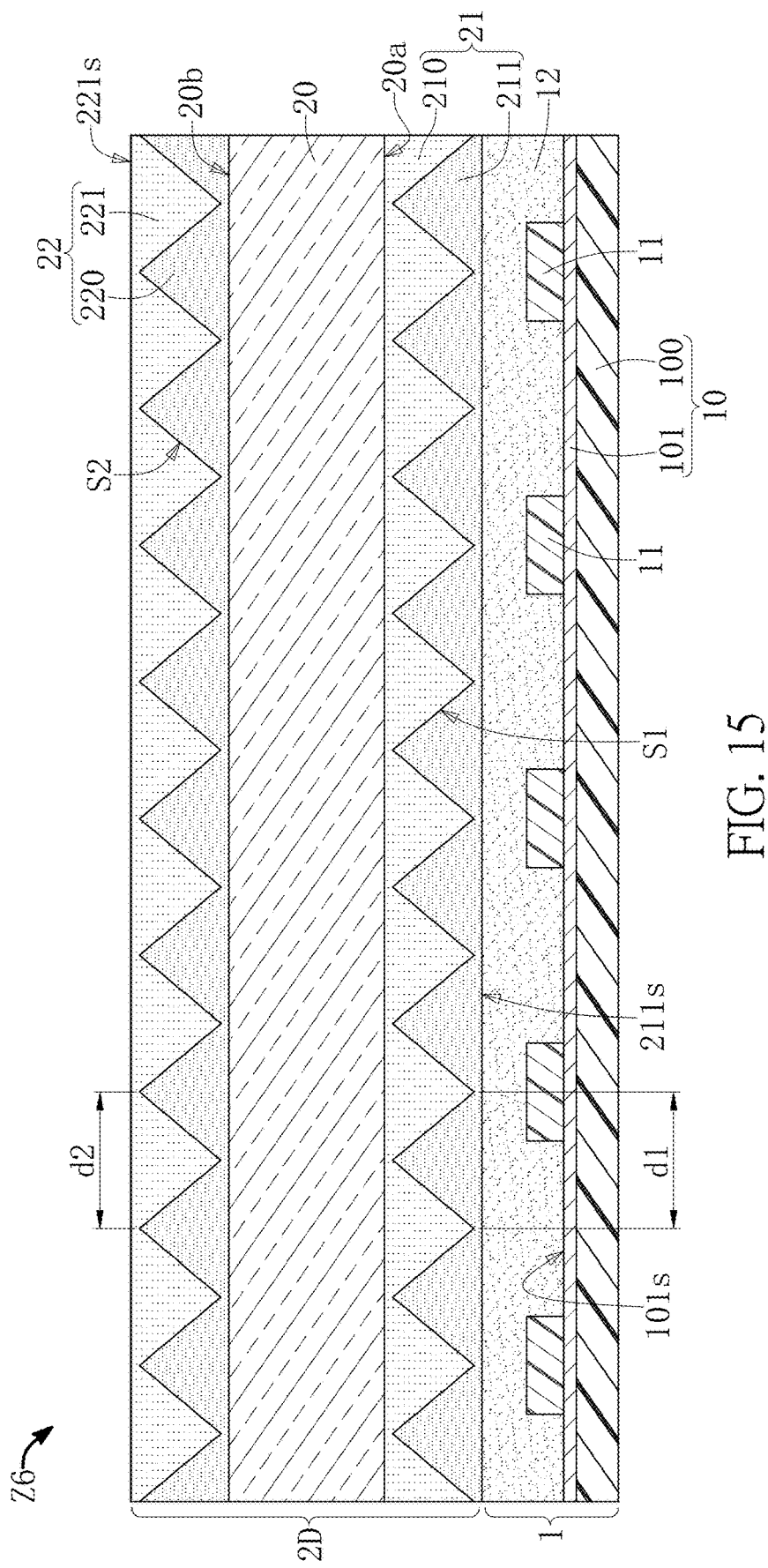
FIG. 15 is a partial schematic side view of the light emitting module according to a sixth embodiment of the present disclosure.
Figure 16:
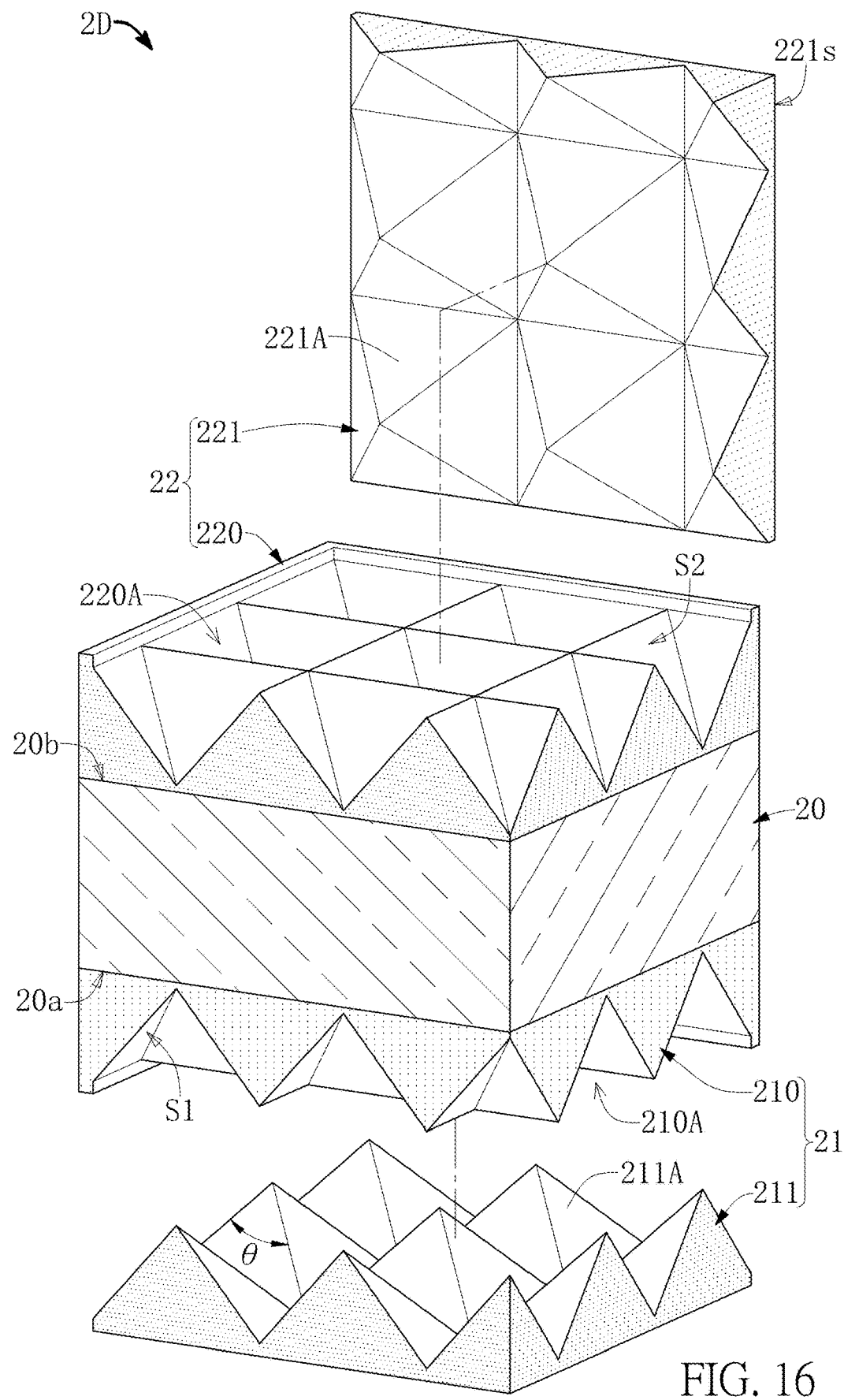
FIG. 16 is a partial perspective exploded view of the optical film of FIG. 15.

Referring to FIG. 15 and FIG. 16, FIG. 15 is a partial schematic side view of the light emitting module according to the sixth embodiment of the present disclosure, and FIG. 16 is a partial perspective exploded view of the optical film of FIG. 15. The same components of the light emitting module Z6 of the present embodiment and the light emitting module Z5 of the fifth embodiment have the same reference numerals, and the same parts will not be repeated. As shown in the optical film 2D of FIG. 15, the second high refractive index layer 220 has a plurality of microstructures. The second distance d2 between the two adjacent microstructures of the second high refractive index layer 220 is equal to the first distance d1 between the two adjacent microstructures of the first low refractive index layer 210, but the present disclosure is not limited thereto.

Referring to FIG. 16, in detail, the first low refractive index layer 210 includes a plurality of recessed microstructures 210A. The first high refractive index layer 211 is filled into the recessed microstructures 210A to form a plurality of protruding microstructures 211A, and the shapes of the protruding microstructures 211A and the recessed microstructures 210A are matched with each other. In this embodiment, the recessed microstructures 210A are concave pyramid microstructures, and the protruding microstructures 211A are convex pyramid microstructures. Each of the recessed microstructures 210A (or each of the protruding microstructures 211A) in this embodiment has four first inclined surfaces S1 connected with each other, and each of the first inclined surfaces S1 is a triangular inclined surface, but the present disclosure is not limited thereto. In another embodiment, each recessed microstructure 210A (or each protruding microstructure 211A) can also only have three first inclined surfaces S1 connected with each other.

As shown in FIG. 16, the vertex angle of at least one triangular inclined surface, the refractive index of the first high refractive index layer 211 and the refractive index of the first low refractive index layer 210 satisfy or meet the following relationship: $\theta \leq (180-2*\arcsin(n10/n11))$, in which $\theta$ is the vertex angle of the triangular inclined surface, n11 is the refractive index of the first high refractive index layer 211, and n10 is the refractive index of the first low refractive index layer 210. In this way, the light beam entering the first optical structure 21 can be reflected and refracted more times.

Different from the first optical structure 21, the second high refractive index layer 220 of the second optical structure 22 includes a plurality of recessed microstructures 220A, and the second low refractive index layer 221 is filled into a plurality of recessed microstructures 220A to form a plurality of protruding microstructures 221A. The recessed microstructures 220A can be concave pyramidal microstructures, and the protruding microstructures 221A can be convex pyramidal microstructures. Accordingly, the shapes of each recessed microstructure 220A of the second high refractive index layer 220 and each protruding microstructure 221A of the second low refractive index layer 221 are matched with each other. Furthermore, each recessed microstructure 220A of the second high refractive index layer 220 has four second inclined surfaces S2 connected with each other, and each second inclined surface S2 is a triangular inclined surface, but the present disclosure is not limited thereto. In another embodiment, each recessed microstructure 220A of the second high refractive index layer 220 can also have only three second inclined surfaces S2 connected with each other.

Figure 17:
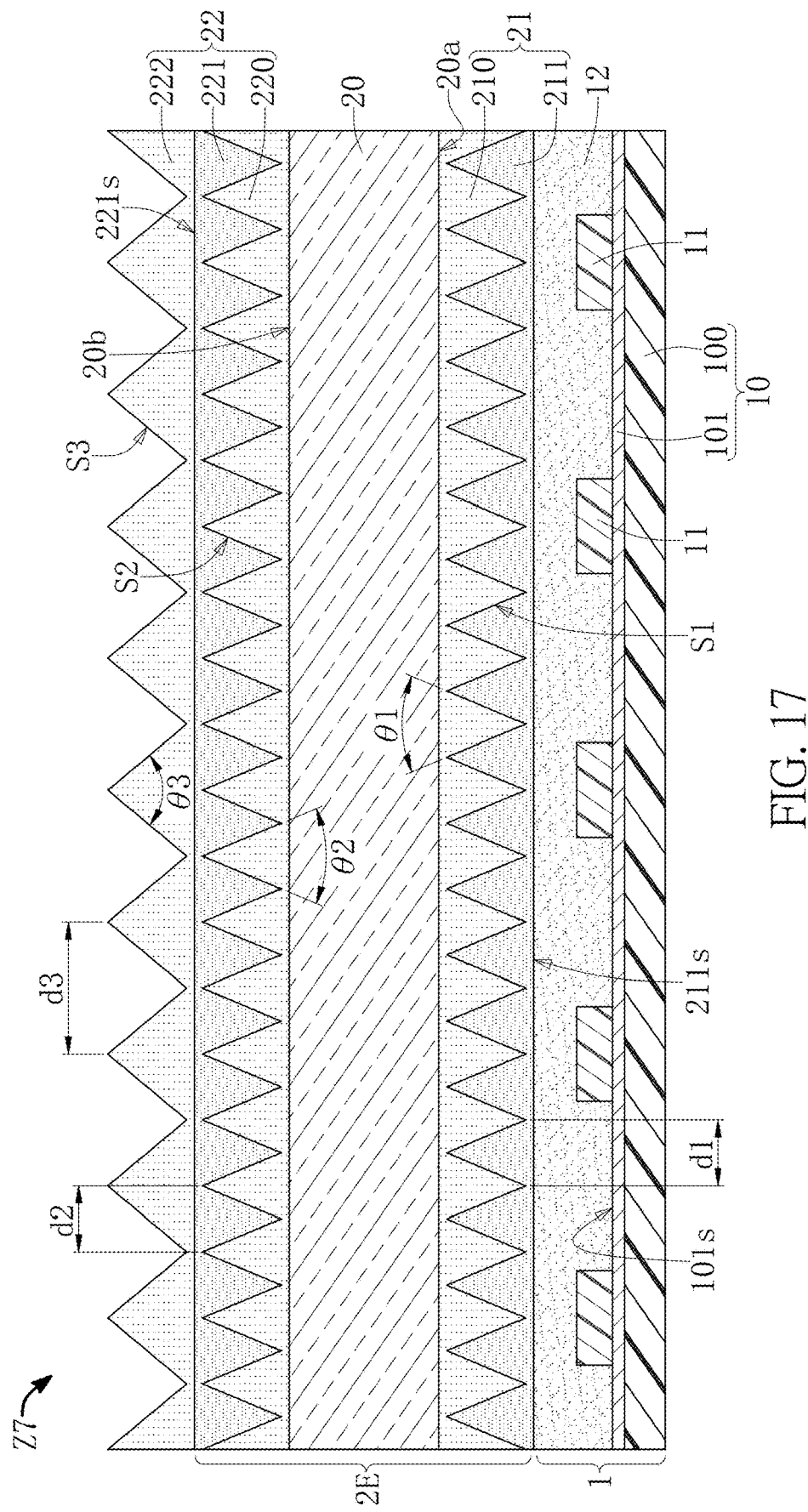
FIG. 17 is a partial schematic side view of the light emitting module according to a seventh embodiment of the present disclosure.

Referring to FIG. 17, which is a partial schematic side view of the light emitting module according to the seventh embodiment of the present disclosure. The same components of the light emitting module Z7 of the present embodiment and the light emitting module Z5 of the fifth embodiment have the same reference numerals, and the same parts will not be repeated.

In this embodiment, the second optical structure 22 of the optical film 2E includes a second high refractive index layer 220, a second low refractive index layer 221 and a third high refractive index layer 222. The second low refractive index layer 221 is located between the second high refractive index layer 220 and the third high refractive index layer 222. It is worth mentioning that the interface between the second high refractive index layer 220 and the second low refractive index layer 221 includes a plurality of second inclined surfaces S2, but the interface between the second low refractive index layer 221 and the third high refractive index layer 222 is a flat surface.

In this embodiment, the third high refractive index layer 222 includes a plurality of third inclined surfaces S3, and a third angle θ3 is formed between every two third inclined surfaces S3 connected with each other. In this embodiment, the second included angle θ2 formed between the two connected second inclined surfaces S2 is smaller than or equal to the third included angle θ3.

In addition, each microstructure of the second high refractive index layer 220 and each microstructure of the third high refractive index layer 222 have different cross-sectional widths. The second distance d2 between any two adjacent microstructures of the second high refractive index layer 220 can be less than or equal to the third distance d3 between any two adjacent microstructures of the third high refractive index layer 222.

Figure 18:
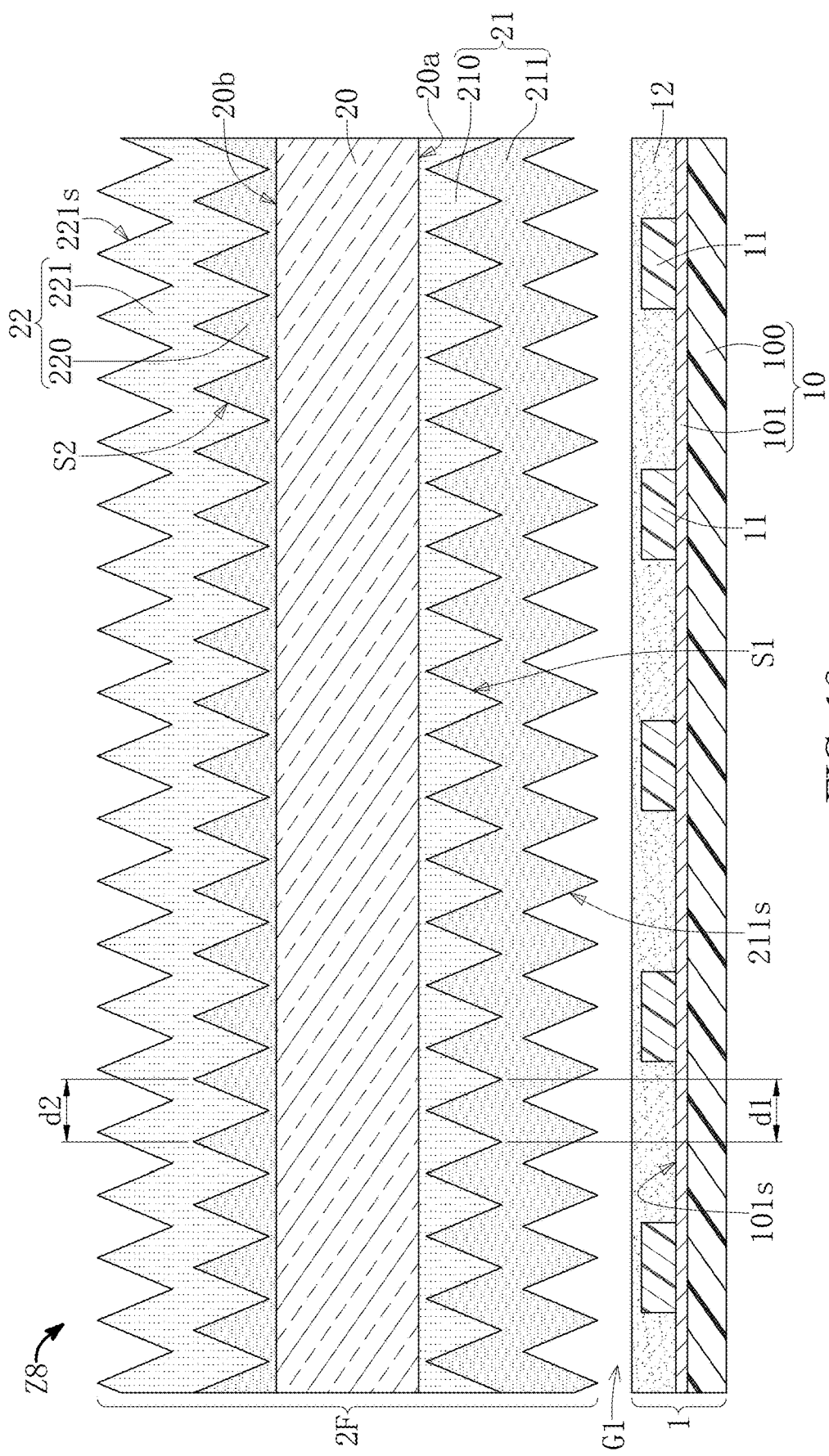
FIG. 18 is a partial schematic side view of the light emitting module according to an eighth embodiment of the present disclosure.

Referring to FIG. 18, which is a partial schematic side view of the light emitting module according to the eighth embodiment of the present disclosure. The same components of the light emitting module Z8 of the present embodiment and the light emitting module Z5 of the fifth embodiment have the same reference numerals, and the same parts will not be repeated.

In this embodiment, the first optical structure 21 and the second optical structure 22 of the optical film 2F are located on the light input side (i.e., the first surface 20a) and the light output side (i.e., the second surface 20b) of the base layer 20, respectively. In this embodiment, the light input surface 211s of the first high refractive index layer 211 of the first optical structure 21 and the outer surface 221s (i.e., the light output surface) of the second low refractive index layer 221 of the second optical structure 22 are not flat surfaces, but have a plurality of recessed microstructures.

In detail, when fabricating the first optical structure 21 of this embodiment, a structure wheel can be used to form the first low refractive index layer 210 having a plurality of recessed microstructures on the first surface 20a of the base layer 20 in advance. After that, the high refractive index adhesive material is used to fill into the recessed microstructures, and then the structure wheel is used to form the recessed microstructures on the outer surface of the high refractive index adhesive material so as to form a first high refractive index layer 211 for covering the first low refractive index layer 210. Accordingly, not only the light-diffus- ing effect of the light beam can be increased, but also the convenience of manufacturing the optical film 2F can be increased.

Therefore, the first high refractive index layer 211 has a plurality of protruding microstructures on the side thereof facing the first low refractive index layer 210, and the shapes of the protruding microstructures and the recessed microstructures can match each other. In addition, the light input surface 211s of the first high refractive index layer 211 also has a plurality of recessed microstructures. It is worth mentioning that each recessed microstructure of the first high refractive index layer 211 and each recessed microstructure of the first low refractive index layer 210 can have substantially the same shape.

In one embodiment, for example, the recessed microstructures of both the first low refractive index layer 210 and the first high refractive index layer 211 can be shown as the recessed microstructures 210A in FIG. 16, and the protruding microstructures of the first high refractive index layer 211 can be shown as the protruding microstructure 211A in FIG. 16, but the present disclosure is not limited thereto. In addition, the positions of the recessed microstructures of the first high refractive index layer 211 do not necessarily have to be aligned with the recessed microstructures of the first low refractive index layer 210. In this way, the light-diffusing effect of the optical film 2F can be enhanced.

Similarly, the second optical structure 22 includes a second high refractive index layer 220 and a second low refractive index layer 221. When fabricating the second optical structure 22 of this embodiment, a structure wheel can be used to form the second high refractive index layer 220 having a plurality of recessed microstructures on the second surface 20b of the base layer 20 in advance. After that, the low refractive index adhesive material is used to fill into the recessed microstructures, and then the structure wheel is used to form the recessed microstructures on the outer surface of the low refractive index adhesive material so as to form a second low refractive index layer 221 for covering the second high low refractive index layer 220.

Therefore, the second low refractive index layer 221 has a plurality of protruding microstructures on the side thereof facing the second high refractive index layer 220, and the shapes of the protruding microstructures and the recessed microstructures can match each other. In addition, the outer surface 221s of the first high refractive index layer 211 also has a plurality of recessed microstructures. Moreover, the positions of the recessed microstructures of the second low refractive index layer 221 do not necessarily have to be aligned with the recessed microstructures of the second high refractive index layer 220. In this way, the light-diffusing effect of the optical film 2F can be enhanced.

Compared with the embodiment of FIG. 15, in this embodiment, both the light input surface 211s and the light output surface (i.e., the outer surface 221s) of the optical film 2F have a plurality of recessed microstructures, so that the light-diffusing effect of the optical film 2F can be further improved. However, in another embodiment, the second optical structure 22 as shown in FIG. 18 can also be omitted or replaced with the second optical structure 22 as shown in FIG. 12, FIG. 15 or FIG. 17.

In addition, the optical film 2F and the light emitting assembly 1 in this embodiment are disposed apart from each other so as to define a gap G1, but the present disclosure is not limited thereto. In another embodiment not shown in the figure, the optical film 2F of this embodiment can also be partially connected to the encapsulation layer 12 of the light emitting assembly 1. Since the light input surface 211s of the optical film 2F has a plurality of recessed microstructures, when the optical film 2F is fixed on the encapsulation layer 12, a plurality of gaps are defined between the optical film 2F and the encapsulation layer 12.

Figure 19:
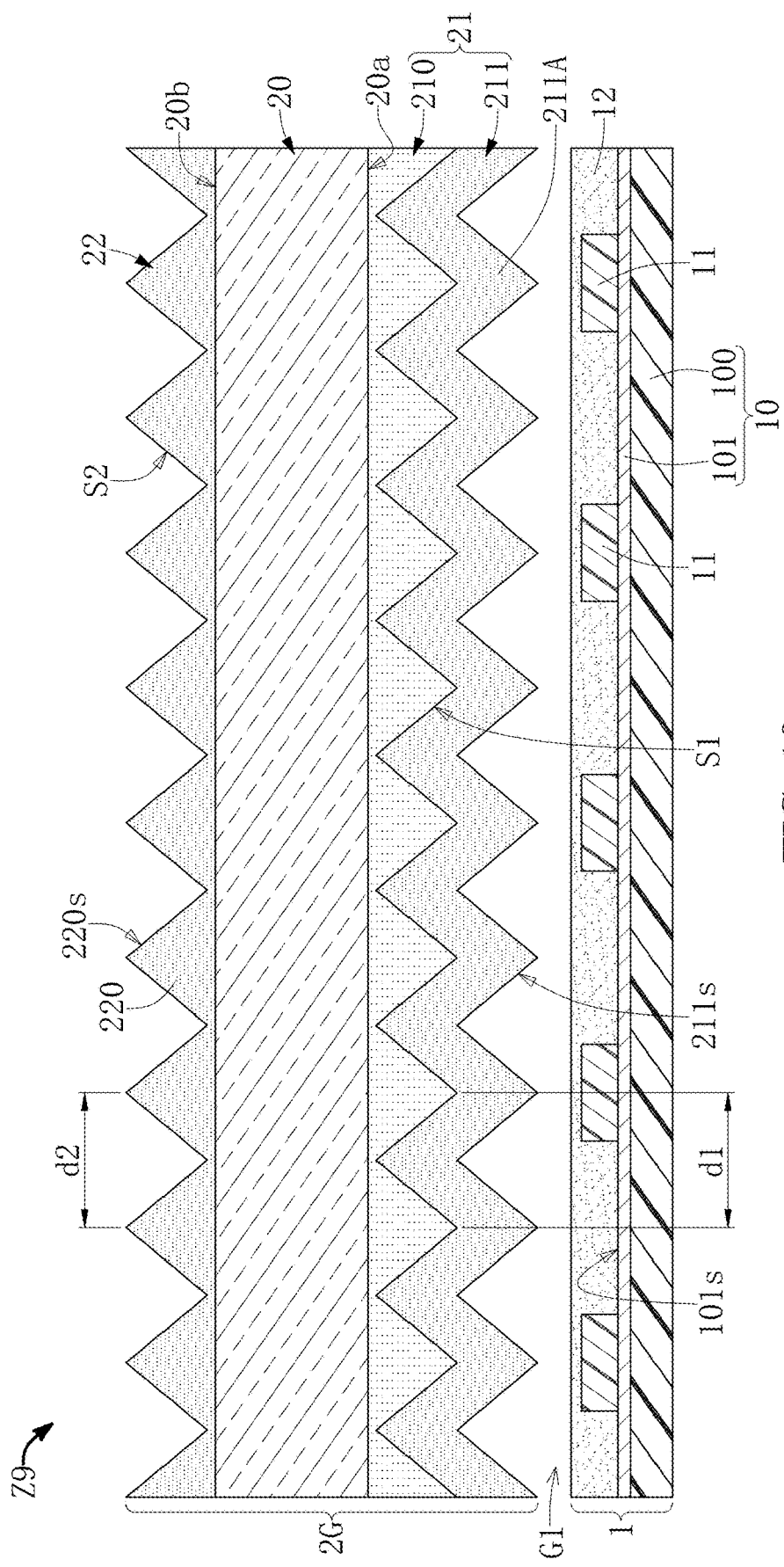
FIG. 19 is a partial schematic side view of the light emitting module according to a ninth embodiment of the present disclosure.
Figure 20:
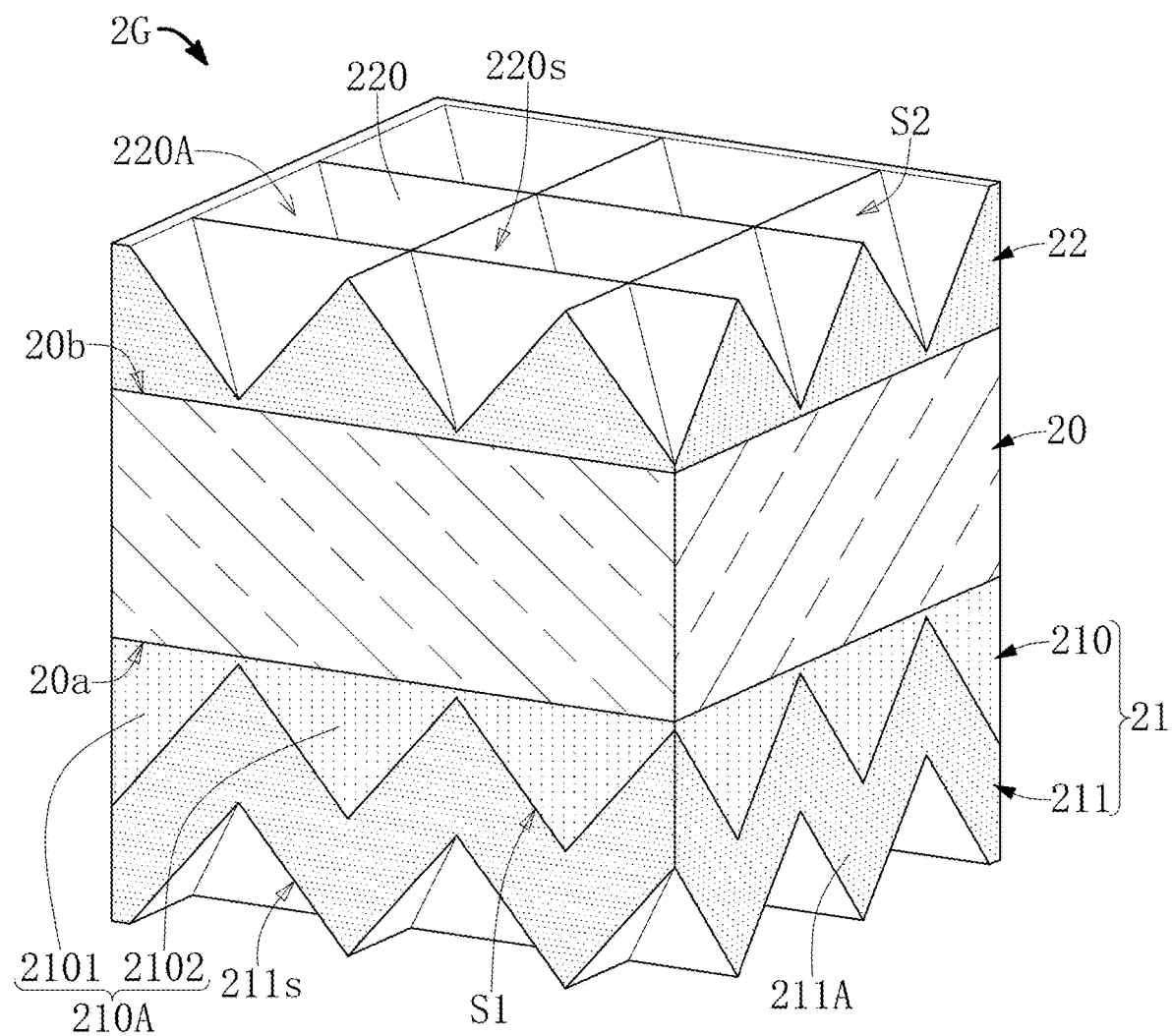
FIG. 20 is a partial schematic enlarged view of the light emitting module according to the ninth embodiment of the present disclosure.

As shown in FIG. 19 and FIG. 20, in one embodiment, the light emitting module Z9 includes a light emitting assembly 1 and an optical film 2G. It is should be noted that the first low refractive index layer 210 has a plurality of recessed microstructures 210A, and the first high refractive index layer 211 fills the recessed microstructures 210A of the first low refractive index layer 210 so as to form a plurality of protruding microstructures 211A that are protruded outward from the first high refractive index layer 211. For example, the first low refractive index layer 210 has a plurality of first convex ribs 2101 and a plurality of second convex ribs 2102, the first convex ribs 2101 and the second convex ribs 2102 are alternately arranged to form a plurality of recessed microstructures 210A, and any two adjacent ones of the recessed microstructures 210A have different depths. In addition, the shape of the protruding microstructures 211A of each first high refractive index layer 211 and the shape of the recessed microstructures 210A of the first low refractive index layer 210 can be matched with each other, and the refractive index of the first high refractive index layer 211 can be greater than the refractive index of the first low refractive index layer 210. Moreover, the second high refractive index layer 220 includes a plurality of recessed microstructures 220A, and the recessed microstructures 220A of the second high refractive index layer 220 can be exposed outside without being filled. Furthermore, the first optical structure 21 has a light input surface 211s facing the light emitting assembly 1, the second optical structure 22 has a light output surface 220s, and the light input surface 211s of the first optical structure 21 and the light output surface 220s of the second optical structure 22 respectively have a plurality of microstructures in different concave shapes and adjacently arranged, thereby increasing the astigmatism effect and avoiding the interference. For example, each recessed microstructure (211A, 220A) can be formed by a plurality of inclined surfaces (such as four inclined surfaces or three inclined surfaces) that are surroundingly arranged, and its cross-sectional width (i.e., the width of the recessed space) can range from 0.01 mm to 0.2 mm, and its cross-sectional depth (i.e., the depth of the recessed space) can range from 5 μm to 100 μm. That is to say, the size and shape of the recessed space provided by each recessed microstructure (211A, 220A) can be changed or adjusted according to different processing parameters (such as fast tool servos systems) so as to create irregularly shaped recessed microstructures, thereby increasing astigmatism and avoiding interference. In addition, the recessed microstructures (211A, 220A) can be arranged according to a variety of different spacing distances, thereby providing a plurality of recessed microstructures 211A with different spacing distances on one plane, or thereby providing a plurality of recessed microstructures 220A with different spacing distances on another plane, and the spacing distance can be defined by a center distance between two adjacent recessed microstructures. That is to say, the two adjacent recessed microstructures (211A or 220A) can be changed or adjusted according to different processing parameters (such as fast tool servos systems) so as to create irregularly shaped recessed microstructures, thereby increasing astigmatism and avoiding interference.

Beneficial Effects of the Embodiments

One of the beneficial effects of the present disclosure is that the optical film and the light emitting module using the optical film can diffuse the light beams generated by the light emitting assembly 1 in order to make the light beam output by the light emitting modules (Z1-Z8) have a more uniform brightness distribution, by virtue of "the optical film (2A-2F, 2B') being disposed above the light emitting units 11, and the optical film (2A-2F, 2B') including a base layer 20 and a first optical structure 21," "the first optical structure 21 including a first high refractive index layer 211 and a first low refractive index layer 210, and the first high refractive index layer 211 being located between the light emitting assembly 1 and the first low refractive index layer 210," and "the first inclined surfaces S1 being formed on an interface between the first high refractive index layer 211 and the first low refractive index layer 210, and each of the first inclined surfaces S1 being inclined relative to a thickness direction of the base layer 20."

In addition, the first included angle θ1 formed by the two connected first inclined surfaces S1, the refractive index n11 of the first high refractive index layer 211 and the refractive index n10 of the first low refractive index layer 210 satisfy or meet the following relationship: $\theta1 \le (180 - 2*\arcsin(n10/n11))$, the probability that the light beam generated by the light emitting unit 11 is projected to the first inclined surfaces S1 for the first time and is totally reflected can be greatly increased, thereby enhancing the light-diffusing effect.

Compared with the prior backlight modules, the light emitting modules (Z1-Z8) of the embodiments of the present disclosure can output diffused point light sources. Accordingly, when the light emitting modules (Z1-Z8) of the embodiments of the present disclosure are applied to a display device, the use of the diffusion sheet and the brightness enhancement sheet can be omitted. Furthermore, by using the light emitting modules (Z1-Z8) according to any embodiment of the present disclosure in the display device, even if the number of the optical films in the optical assembly is reduced, the display area can still have uniform brightness distribution. In this way, the overall thickness of the optical assemblies and the size of the display device can be further reduced.

In addition, by using any one of the optical films (2A to 2F, 2B') provided by the embodiments of the present disclosure, the light beam generated by the light emitting assembly 1 can be diffused. In addition, in the embodiment of the present disclosure, the inside of the first optical structure 21 (or the second optical structure 22) can have a plurality of bubbles b1 distributed in high density, so that the refraction, the reflection and the scattering of the light beam are increased so as to increase the light-diffusing effect of the light beam.

In one embodiment, the first optical structure 21 (or the second optical structure 22) further includes a plurality of nanoparticles P1 distributed in the interior thereof. Some nanoparticles P1 can combine with some bubbles b1. In this way, when the first optical structure 21 or the second optical structure 22 is used, the bubbles b1 combined with the nanoparticles P1 are more easily retained, so that the first optical structure 21 or the second optical structure 22 has more bubbles b1 so as to improve the light-diffusing effect.

It should be noted that, the optical films (2A to 2F, 2B') do not necessarily need to be directly arranged on the light emitting assembly 1. Other optical films (such as brightness enhancement films) or quantum dot films can also be arranged between the optical films (2A to 2F, 2B') and the light emitting assembly 1. In addition, the optical films (2A to 2F, 2B') of the embodiment of the present disclosure are not limited to be applied in the light emitting modules (Z1-Z8), but can also be applied in optical assemblies, and cooperate with other optical films (such as light guide plates) to diffuse or spread the light beam. The optical films (2A to 2F, 2B') provided in the embodiments of the present disclosure can also be applied in lighting devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments can become apparent to those skilled in the art to which the present disclosure pertains without departing from its spirit and scope.

What is claimed is:

1. A light emitting module, comprising:
a light emitting assembly including a substrate and a plurality of light emitting units disposed on the substrate; and
an optical film disposed above the light emitting units, wherein the optical film includes:
a base layer; and
a first optical structure disposed on the base layer and including a first high refractive index layer and a first low refractive index layer, wherein the first high refractive index layer is located between the light emitting assembly and the first low refractive index layer, a plurality of first inclined surfaces are formed on an interface between the first high refractive index layer and the first low refractive index layer, and each of the first inclined surfaces is inclined relative to a thickness direction of the base layer;
wherein the first low refractive index layer has a plurality of recessed microstructures, the first high refractive index layer fills the recessed microstructures of the first low refractive index layer so as to form a plurality of protruding microstructures on the first high refractive index layer, a shape of each of the protruding microstructures of the first high refractive index layers and a shape of each of the recessed microstructures of the first low refractive index layer cooperate with each other, and a refractive index of the first high refractive index layer is greater than a refractive index of the first low refractive index layer.

2. The light emitting module according to claim 1, wherein a ratio between the refractive index of the first low refractive index layer and the refractive index of the first high refractive index layer ranges from 0.85 to 0.97.

3. The light emitting module according to claim 1, wherein the optical film further includes a second optical structure, the first optical structure and the second optical structure are respectively located on two opposite sides of the base layer, the first optical structure has a light input surface facing the light emitting assembly, the second optical structure has a light output surface, the light input surface and the light output surface respectively have a plurality of microstructures, and the microstructures are concaved and adjacently arranged.

4. The light emitting module according to claim 1, wherein two of the first inclined surfaces connected with each other to form a first included angle, and the first included angle, the refractive index of the first high refractive index layer and the refractive index of the first low refractive index layer satisfy the following relationship: $\theta1 \leq (180 - 2*\arcsin(n10/n11))$; wherein $\theta1$ is the first included angle, $n11$ is the refractive index of the first high refractive index layer, and $n10$ is the refractive index of the first low refractive index layer.

5. The light emitting module according to claim 1, wherein at least one of the first low refractive index layer or the first high refractive index layer has a plurality of bubbles and a plurality of nanoparticles, at least one of the nanoparticles is combined with one of the bubbles, and an average particle diameter of the nanoparticles does not exceed 100 nm.

6. The light emitting module according to claim 1, wherein the first high refractive index layer has a light input surface, and the light input surface has a plurality of matte structures thereon, and the matte structure has a haze ranging from 3% to 30%.

7. The light emitting module according to claim 1, wherein the recessed microstructure of each of the first low refractive index layers is a concave pyramid microstructure, and the protruding microstructure of each of the first high refractive index layers is a convex pyramid microstructure.

8. The light emitting module according to claim 1, wherein the first low refractive index layer has a plurality of first convex ribs and a plurality of second convex ribs, the first convex ribs and the second convex ribs are alternately arranged to form the plurality of recessed microstructures, and any two adjacent ones of the recessed microstructures have different depths.

9. The light emitting module according to claim 1, wherein the optical film further includes a second optical structure, the first optical structure and the second optical structure are respectively located on a light input side and a light output side of the base layer, and the second optical structure includes a second high refractive index layer and a second low refractive index layer; wherein the second high refractive index layer is located between the second low refractive index layer and the base layer; wherein the second high refractive index layer includes a plurality of another recessed microstructures, and the second low refractive index layer fills the recessed microstructures of the second high refractive index layer so as to form a plurality of another protruding microstructures on the second high refractive index layer.

10. An optical film, comprising:
a base layer; and
a first optical structure disposed on a light input side of the base layer and including a first high refractive index layer and a first low refractive index layer, wherein the first high refractive index layer is located between the first high refractive index layer and the base layer, a plurality of first inclined surfaces are formed on an interface between the first high refractive index layer and the first low refractive index layer, and each of the first inclined surfaces is inclined relative to a thickness direction of the base layer;
wherein the first low refractive index layer has a plurality of recessed microstructures, the first high refractive index layer fills the recessed microstructures of the first low refractive index layer so as to form a plurality of protruding microstructures on the first high refractive index layer, a shape of each of the protruding microstructures of the first high refractive index layers and a shape of each of the recessed microstructures of the first low refractive index layer cooperate with each other, and a refractive index of the first high refractive index layer is greater than a refractive index of the first low refractive index layer.

11. The optical film according to claim 10, wherein a ratio between the refractive index of the first low refractive index layer and the refractive index of the first high refractive index layer ranges from 0.85 to 0.97.

12. The optical film according to claim 10, wherein the recessed microstructure of each of the first low refractive index layers is a concave pyramid microstructure, the protruding microstructure of each of the first high refractive index layers is a convex pyramid microstructure, the convex pyramid microstructure includes at least one triangular inclined surface, and a vertex angle of the at least one triangular inclined surface, the refractive index of the first high refractive index layer and the refractive index of the first low refractive index layer satisfy the following relationship: $\theta \leq (180-2*\arcsin(n10/n11))$; wherein $\theta$ is the vertex angle, $n11$ is the refractive index of the first high refractive index layer, and $n10$ is the refractive index of the first low refractive index layer.

13. The optical film according to claim 10, further comprising a second optical structure disposed on a light output side of the base layer, and the second optical structure including a second high refractive index layer and a second low refractive index layer; wherein the second high refractive index layer is located between the second low refractive index layer and the base layer; wherein the second high refractive index layer includes a plurality of another recessed microstructures, and the second low refractive index layer fills the recessed microstructures of the second high refractive index layer so as to form a plurality of another protruding microstructures on the second high refractive index layer.

14. The optical film according to claim 10, further comprising a second optical structure, wherein the first optical structure and the second optical structure are respectively located on two opposite sides of the base layer, the first optical structure has a light input surface facing the light emitting assembly, the second optical structure has a light output surface, the light input surface and the light output surface respectively have a plurality of microstructures, and the microstructures are concaved and adjacently arranged.

15. An optical film, comprising:
a base layer;
a first optical structure disposed on a light input side of the base layer and including a first high refractive index layer and a first low refractive index layer, wherein the first high refractive index layer is located between the first high refractive index layer and the base layer; and
a second optical structure disposed on a light output side of the base layer;
wherein the first low refractive index layer, a light input surface of the first high refractive index layer and a light output surface of the second optical structure respectively have a plurality of recessed microstructures, the recessed microstructures are recessed in a direction toward the base layer, and the recessed microstructure of the first low refractive index layer is filled by the first high refractive index layer, and a refractive index of the first high refractive index layer is greater than a refractive index of the first low refractive index layer.

16. The optical film according to claim 15, wherein each of the recessed microstructures is formed by a plurality of inclined surfaces, a cross-sectional width of the recessed microstructure is between 0.01 mm and 0.2 mm, and a cross-sectional depth of the recessed microstructure is between 5 μm and 100 μm; wherein the recessed microstructures are arranged according to different spacing distances, thereby providing the recessed microstructures with the different spacing distances on a same plane; wherein each of the spacing distances is determined by a center distance between two adjacent ones of the recessed microstructures.

* * * * *